US 7,007,555 B2

(12) United States Patent
Strong et al.

(10) Patent No.: US 7,007,555 B2
(45) Date of Patent: Mar. 7, 2006

(54) SYSTEM AND METHOD OF HORIZONTAL WAVE MEASUREMENT

(75) Inventors: Brandon S. Strong, San Diego, CA (US); Blair H. Brumley, La Jolla, CA (US); Jerald W. Mullison, Carlsbad, CA (US)

(73) Assignee: Teledyne RD Instruments, Inc., San Diego, CA (US)

( * ) Notice: Subject to any disclaimer, the term of this patent is extended or adjusted under 35 U.S.C. 154(b) by 0 days.

(21) Appl. No.: 10/915,114

(22) Filed: Aug. 10, 2004

(65) Prior Publication Data

US 2005/0199056 A1   Sep. 15, 2005

Related U.S. Application Data

(60) Provisional application No. 60/553,296, filed on Mar. 15, 2004, provisional application No. 60/576,278, filed on Jun. 1, 2004.

(51) Int. Cl.
*G01F 1/20* (2006.01)

(52) U.S. Cl. .................................................. 73/861.18

(58) Field of Classification Search ............. 73/861.18, 73/861.25; 702/48; 367/87, 89, 90
See application file for complete search history.

(56) References Cited

U.S. PATENT DOCUMENTS

| 4,062,237 | A | | 12/1977 | Fox |
| 5,208,785 | A | | 5/1993 | Brumley et al. |
| 5,521,883 | A | | 5/1996 | Fage et al. |
| 6,052,334 | A | * | 4/2000 | Brumley et al. ............... 367/90 |
| 6,282,151 | B1 | * | 8/2001 | Brumley et al. ............... 367/90 |
| 6,700,834 | B1 | * | 3/2004 | Strong et al. .................. 367/90 |
| 2004/0184350 | A1 | | 9/2004 | Brumley et al. |

FOREIGN PATENT DOCUMENTS

| GB | 2128833 A | 5/1984 |
| JP | 10197549 | 7/1998 |
| JP | 2948472 | 7/1999 |

OTHER PUBLICATIONS

REX 90/006,088, Aug. 20, 2001, Brumley et al.
Allender, et al., The WADIC Project: A Comprehensive Field Evaluation of Directional Wave Instrumentation, Ocean Engineering, vol. 16, No. 56, pp. 505-536, 1989.
Glad, I.K., et al. (1992) The maximum-likelihood property of estimators of wave parameters from heave, pitch, and roll buoys. American Meteorological Society V.9:169-173.
Hashimoto, N., et al. (1996) Improvement of submerged Doppler-type directional wave meter and its application to field observations. Coastal Engineering 629-642.
Haug and Krogstad, Estimations of Directional Spectra by ML/ME Methods, Proc. Ocean Wave Measurement and Analysis, pp. 394-405, Jul. 1993.

(Continued)

*Primary Examiner*—William Oen
(74) *Attorney, Agent, or Firm*—Knobbe Martens Olson & Bear LLP

(57) ABSTRACT

A system and method of horizontal wave measurement is disclosed. The system for measuring the directional spectrum of waves in a fluid medium having a substantially planar surface may include a sonar system having a plurality of transducers for generating respective acoustic beams and receiving echoes from one or more range cells located substantially within the beams, at least one of the plurality of acoustic beams being angled non-orthogonally to at least one other of the plurality of acoustic beams. The method may calculate the directional spectrum associated with the waves from the received echoes.

31 Claims, 15 Drawing Sheets

OTHER PUBLICATIONS

Herbers, T.H., et al. (1991) Field Verification of Acoustic Doppler Surface Gravity Wave Measurements. Journal of Geophysical Research V.96, No. C9:17,023-17,035.

Kirlin, R. Lynn, Estimation of Transfer Function Parameters with Output Fourier Transform Sensitivity Vectors. 1997 IEEE International Conference on Acoustics, Speech, and Signal Processing (Cat. No. 97CB36052) Munich, Germany, Apr. 21-24, 1997, pp. 3933-3936, vol. 5.

Krogstad, H.E., et al. (1988) High-resolution directional wave spectra from horizontally mounted acoustic Doppler current meters. Journal of Atmospheric and Oceanic Technology V.5, No. 4: 340-352.

Krogstad, H.E., Maximum Likelihood Estimation of Ocean Wave Spectra from General Arrays of Wave Gauges, Modeling, Identification, and Control, vol. 9, No. 2, pp. 81-97, 1988.

Pinkel, R. et al. (1987) Open ocean surface wave measurement using Doppler sonar. Journal of Geophysical Research V.92, No. C12:12,967-12.973.

Smith, J. A. (1989) Doppler sonar and surface waves: range and resolution. Journal of Atmospheric and Oceanic Technology V6:680-696.

Smith, J.A., et al. (1995) Directional surface wave estimates from Doppler sonar data. Journal of Atmospheric and Oceanic Technology V.12:617-632.

Stockhausen, W.T. (1994) Directional wave spectra using an acoustic doppler current profiler. A Thesis. Library of the Virginia Institute of Marine Science.

Takayama, T., et al. (1994) Development of a submerged Doppler-type directional wave meter. Coastal Engineering C.46:624-634.

Terray E. et al., Measuring Waves and Currents With an Upward-Looking ADCP, IEEE 1999, 66-71.

Terray, E. et al., Measuring Wave Height and Direction Using Upward-Looking ADCP, Oceans '97, MTS/IEEE Conference Proceedings (Cat. No. 97 CH36105). Halifax, NS, Canada, Oct. 6-9, 1999, pp. 287-290 vol. 1.

Terray, E., et al. (1997) Measuring wave height and direction using upward-looking ADCP's. IEEE Oceans '97 1-4.

Terray, E.A., et al. (1990) Measuring wave direction using upward-looking Doppler sonar. Proceedings of the IEEE Fourth Working Conference on Current Measurement 1-6 and Fig. 1—Fig. 4.

Trevorrow, et al., Extraction of Ocean Wave Directional Spectra Using Steerable Doppler Side-Scan Sonars, Am. Meterological Society, pp. 1087-1100, Oct. 1995.

Trevorrow, Mark V., Measurement of Ocean Wave Directional Spectra Using Doppler Side-Scan Sonar Arrays, Am. Meteorological Society, pp. 603-616, Jun. 1995.

Visbeck, M., et al. (1995) Sea surface conditions remotely sensed by upward-looking ADCP's. Journal of Atmospheric and Oceanic Technology V12:141-149.

Zedel, L. (1994) Deep ocean wave measurements using a vertically oriented sonar. Journal of Atmospheric and Oceanic Technology V.11:182-191.

* cited by examiner

SYSTEM AND METHOD OF HORIZONTAL WAVE MEASUREMENT

RELATED APPLICATIONS

This application claims the benefit of U.S. Provisional Application No. 60/553,296, filed Mar. 15, 2004, and U.S. Provisional Application No. 60/576,278, filed Jun. 1, 2004, both of which are incorporated by reference.

BACKGROUND OF THE INVENTION

1. Field of the Invention

The present invention relates to underwater acoustic measurement systems and, more particularly, to acoustic Doppler current profilers used to measure wave directional spectra and surface wave height.

2. Description of the Related Technology

An acoustic Doppler current profiler (ADCP) is an instrument that obtains profiles of water velocity by transmitting sound of known frequency into the water and measuring the Doppler shift of reflections from scatterers, which are assumed to be passively moving with the water. One such ADCP is disclosed in assignee's U.S. Pat. No. Re. 35,535, which is incorporated by reference. For use in applications such as offshore platforms and port entrances, it is desirable for such instruments to profile the near-surface currents by looking from a platform or piling. One such ADCP is disclosed in assignee's U.S. Pat. No. 6,052,344, which is incorporated by reference. Applications for wave measurement ADCP include saltwater and freshwater bodies such as oceans, seas and lakes.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Embodiments" one will understand how the features of this invention provide advantages that include, for example, improved wave profiling from locations such as platforms and port entrances.

One embodiment is a method of calculating wave spectra in a fluid medium utilizing a plurality of acoustic transducers. The method includes receiving echoes produced within at least two range cells. The echoes are generated by a plurality of acoustic beams from the transducers. At least one of the plurality of acoustic beams is positioned at a non-orthogonal angle with respect to at least one other of the plurality of acoustic beams. The beams have the at least two range cells located at least partly therein. The signals associated with the echoes include data indicative of a plurality of observed frequencies. The method further includes for each of the plurality of observed frequencies: calculating a cross-spectral matrix, data adaptively estimating the wave directional spectrum by use of the cross-spectral matrix, and calculating a non-directional height spectrum by use of the wave directional spectra.

Embodiments may include certain other features. In one embodiment, the method further includes calculating a full two-dimensional directional spectrum. In one embodiment, data adaptively estimating the wave directional spectrum includes performing at least one of a maximum likelihood method and an iterative maximum likelihood method. In one embodiment, data adaptively estimating the wave directional spectrum includes performing an iterative eigenvector method. In one embodiment, the non-orthogonal angle includes an angle in the range of 20 degrees to 40 degrees. In one embodiment, the at least one of the plurality of acoustic beams includes a substantially circular acoustic beam.

Another embodiment is a system for measuring the directional spectrum of waves in a fluid medium having a substantially planar surface. The system includes a sonar system having a plurality of transducers for generating respective acoustic beams and receiving echoes from one or more range cells located substantially within the beams. At least one of the plurality of acoustic beams is generated at a non-orthogonal angle with respect to at least one other of the plurality of acoustic beams. The system further includes a computer program, executed by a processor, configured to calculate a directional spectrum associated with the waves from the received echoes. The computer program further utilizes a sensitivity vector as part of the calculation of the directional spectrum. The sensitivity vector includes an element for each range cell from a particular beam at a particular depth.

Embodiments may include certain other features. In one embodiment, the sonar system includes a broadband acoustic Doppler current profiler (ADCP). In one embodiment, the non-orthogonal angle is approximately 20 degrees. In one embodiment, the non-orthogonal angle includes an angle in the range of 20 degrees to 40 degrees. In one embodiment, the received echoes are related to the current velocity within the range cells. In one embodiment, the transducers are in a phased array configuration. In one embodiment, the computer program is further configured to calculate a non-directional height spectrum. In one embodiment, the computer program is further configured to calculate a cross-spectral matrix and calculate the two dimensional directional spectrum from the cross-spectral matrix, the directional spectrum, and the sensitivity vector.

Another embodiment is a method of calculating the directional spectrum of a wave in a fluid medium utilizing a plurality of acoustic transducers. The method includes generating a plurality of acoustic beams from the transducers. At least one of the plurality of acoustic beams is positioned at a non-orthogonal angle with respect to at least one other of the plurality of acoustic beams, and the beams have range cells located at least partly therein. The method further includes receiving echoes produced within an array comprising two or more of the range cells and processing signals indicative of the received echoes. The method further includes storing a sensitivity vector. The vector is formed from data based on the signals and the geometry of the array of range cells. The sensitivity vector includes elements for at least two range cells at different depths within an acoustic beam. The method further includes estimating the directional spectrum of the wave based on the signals and the sensitivity vector.

Embodiments may include certain other features. In one embodiment, the non-orthogonal angle includes an angle in the range of 10 degrees to 89 degrees. In one embodiment, the non-orthogonal angle includes an angle in the range of 20 degrees to 40 degrees. In one embodiment, the method further includes calculating a non-directional spectrum based at least partly on the directional spectrum. In one embodiment, the processing of the signals indicative of the received echoes includes decoding the raw data associated with the received echoes, calculating the position and orientation of each of the range cells, calculating a mean value of current in the fluid medium, and numerically inverting a linear dispersion relation, wherein the linear dispersion relation relates wave frequency, water depth, and wave number. In one embodiment, the method additionally includes generating the sensitivity vector which includes selecting at least one range cell from at least two of the acoustic beams, calculating a plurality of velocity components for each of the selected range cells, calculating a plurality of Fourier coefficients associated with each of the velocity components, and calculating the sensitivity vector from the plurality of Fourier coefficients. In one embodiment, the estimating of the directional spectrum includes calculating the cross-spectral matrix C, calculating a directional spectrum at each observed frequency, normalizing the directional spectrum at each observed frequency, calculating the wave power spectrum utilizing the normalized directional spectrum, and scaling the normalized directional spectrum using the wave power spectrum. In one embodiment, the sensitivity vector comprises elements corresponding to surface height and pressure within the fluid medium. In one embodiment, the estimating the directional spectrum comprises maximum likelihood processing of the signals indicative of the received echoes. In one embodiment, the estimating the directional spectrum comprises filtering directional noise components from the directional spectrum. In one embodiment, filtering directional noise components from the directional spectrum comprises removing portions of the spectrum below a directionally-dependent threshold. In one embodiment, the estimates of the directional spectrum further includes iterative maximum likelihood method (IMLM) processing.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Vertically profiling ADCPs are known and commercially available. One such instrument is disclosed in U.S. Pat. No. 6,282,151, issued on Aug. 28, 2001, and which is incorporated by reference. It has been found that in applications such as offshore platforms and port entrances it is advantageous to be able to measure the currents by looking sideways, or horizontally from a platform or piling.

Figure 1:
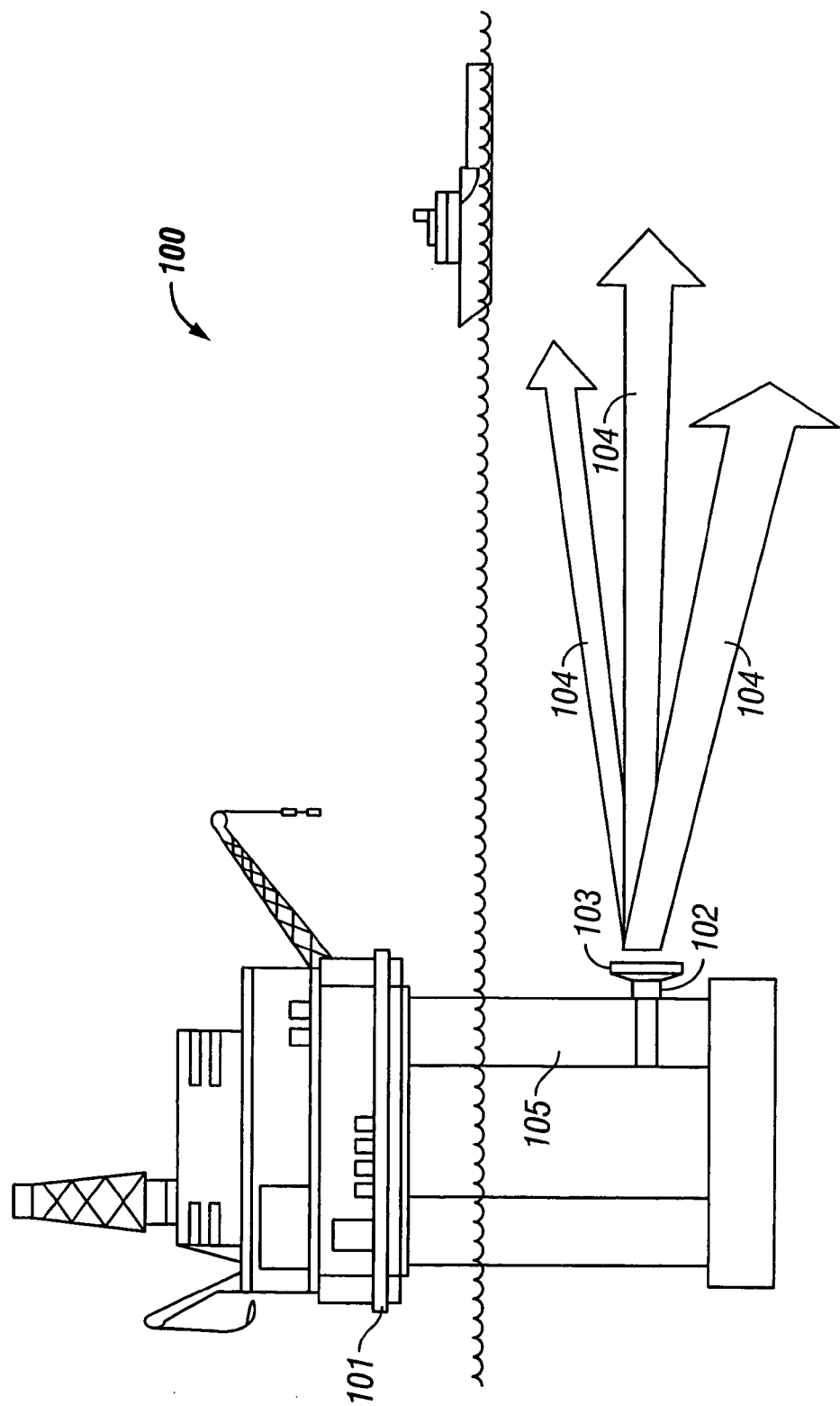
FIG. 1 is side schematic view depicting one embodiment of a horizontal ADCP system including a platform.

FIG. 1 is a side schematic view depicting one embodiment of horizontal ADCP system 100 attached to a platform 101. A processing unit 102 and a transducer array 103 are affixed to a riser 105 of the platform 101. The processing unit 102 includes electronics, software, and other components configured to generate a sonar signal and to receive and process the resulting echo signals. The transducer array 103 includes one or more transducer elements (not shown) that generate a corresponding plurality of acoustic beams 104. In one embodiment, the transducer array 103 includes three or more transducer elements. The beams 104 project in a substantially horizontal plane from the platform 101.

Figure 2:
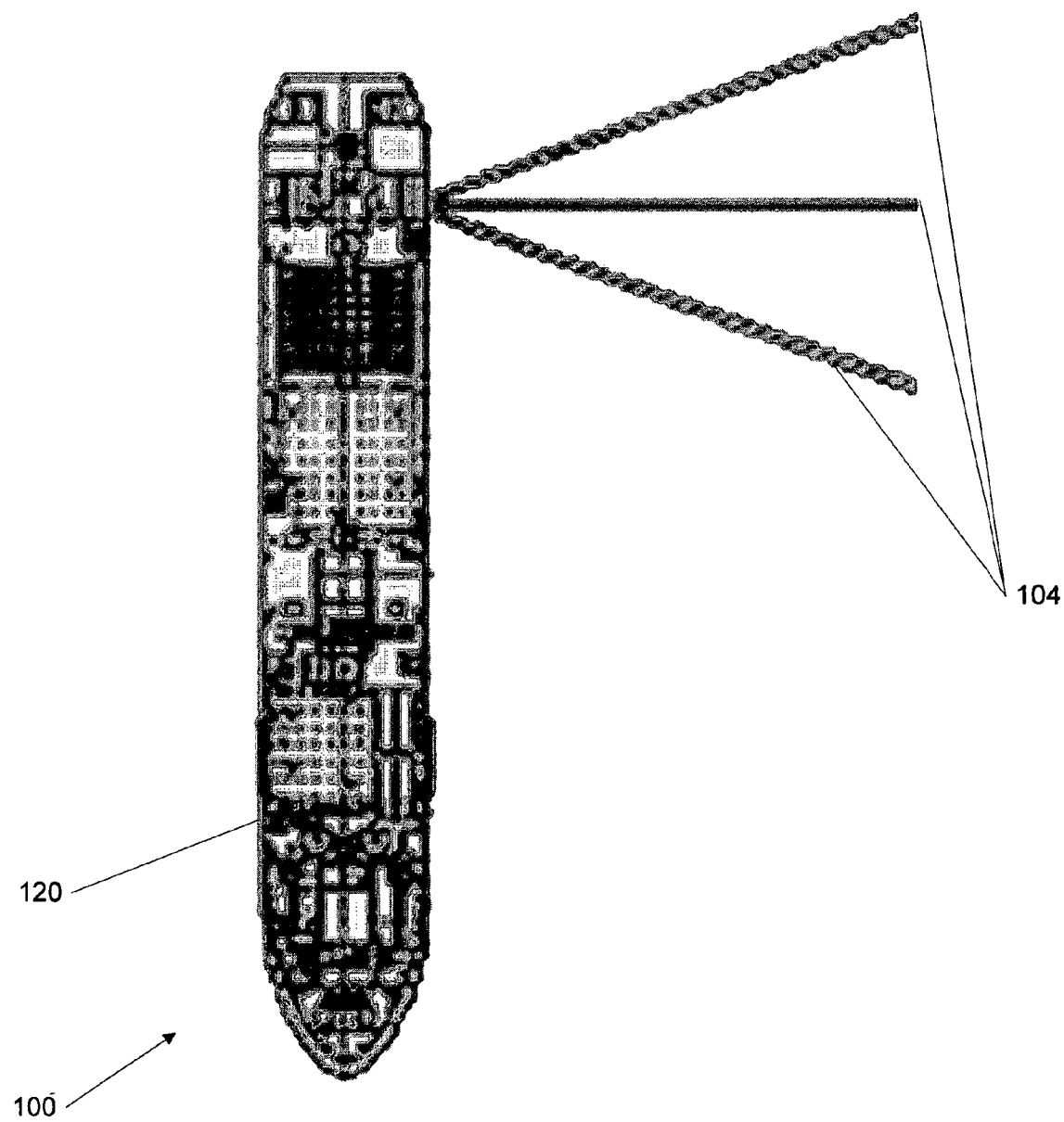
FIG. 2 is a top schematic view illustrating another embodiment of the horizontal ADCP system, similar to that depicted in FIG. 1, but including a surface vessel rather than a platform.

FIG. 2 is a top schematic view illustrating another embodiment of the horizontal ADCP system, 100 similar to that depicted in FIG. 1, but including a surface vessel 120 rather than the platform 101. It is to be appreciated that in other embodiments, the transducer array 103 may be mounted in any manner such as are well known in the art.

Figure 3A:
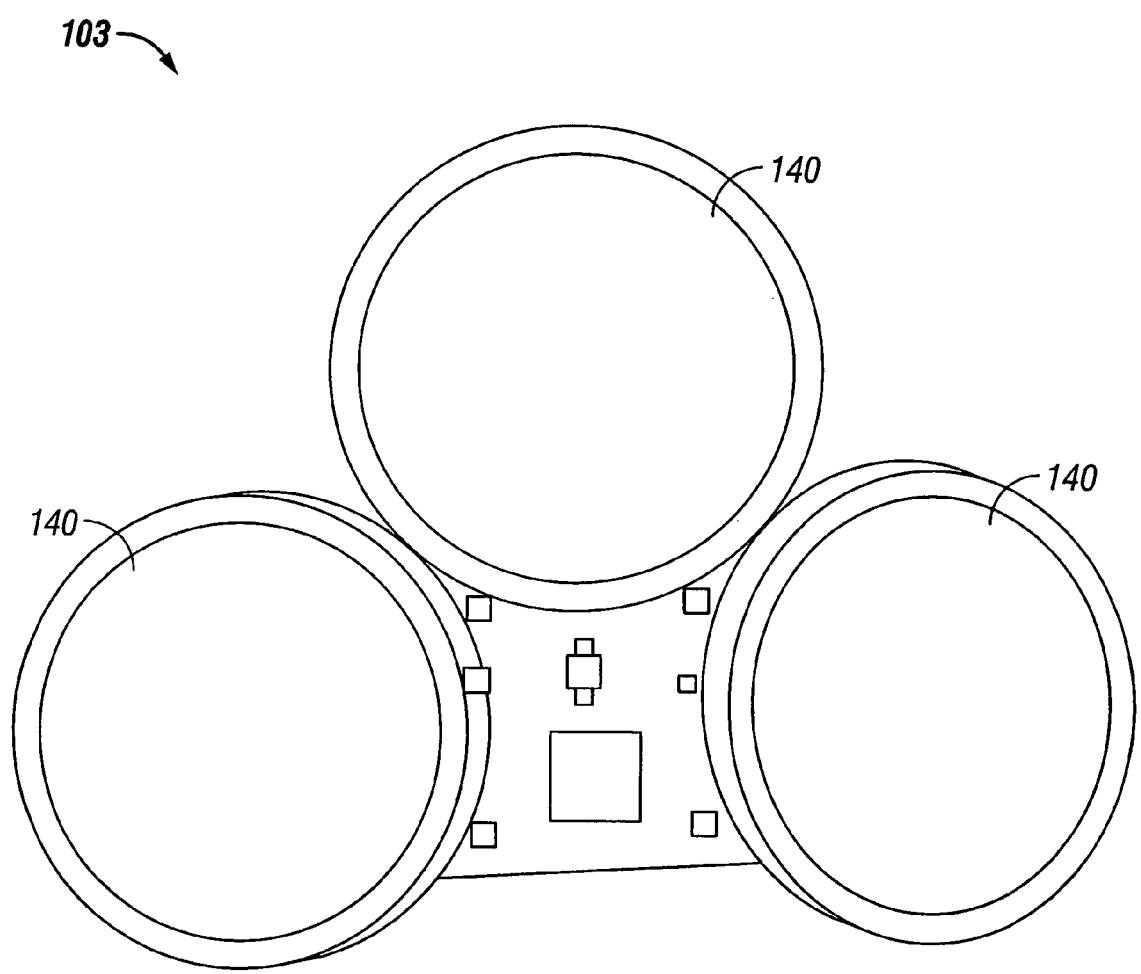
FIG. 3A is a front plan view of a transducer array of the system depicted in FIG. 1.

FIG. 3A is a front plan view of a transducer array 103 of the system 100 depicted in FIG. 1. In one exemplary embodiment, the transducer array 103 includes three transducers 140 in the well known Janus configuration. In one embodiment, the transducer array 103 includes two transducers 140a configured to produce beams 104 in a 20 degree Janus configuration and one transducer 140b configured to produce one beam 104 in the center. In one embodiment, the transducers 140 operate using a 300 kHz signal. In a 300 kHz embodiment, the processing unit 102 may provide a sample rate of up to 2 Hz for up to 200 meter range operation. In other embodiments, the transducer array 103 may be configured to produce beams 104 separated by angles other than twenty degrees. Moreover, in certain embodiments, the beams 104 may be separated by angles selected to be in the range of 20°–40°. In general, utilizing a non-orthogonal geometry increases the measurable profiling range. In addition, having beams closer generally increases the likelihood that the beams are measuring the same flow.

Figure 3B:
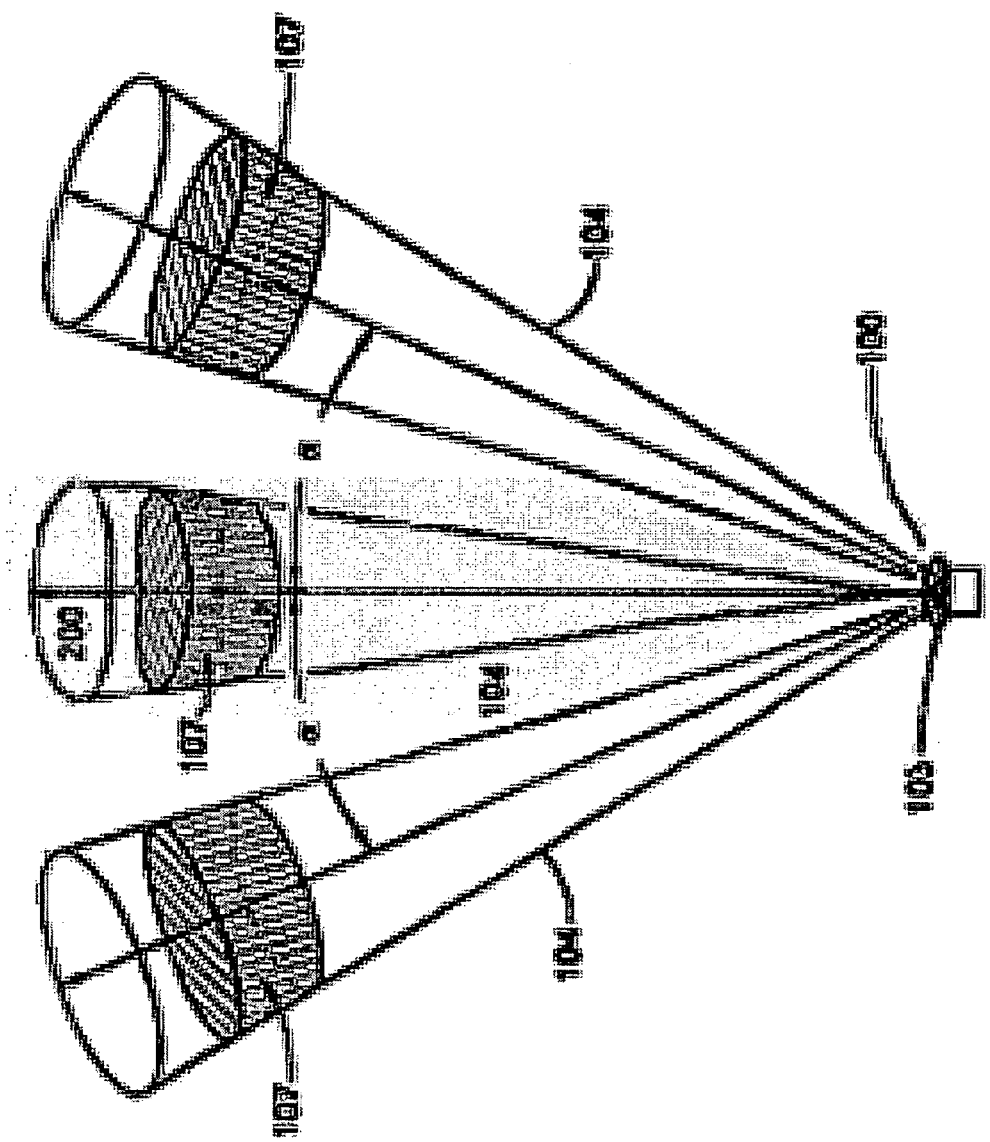
FIG. 3B is a top schematic view of the transducer array of FIG. 3A.

FIG. 3B is a top view of the embodiment of the sonar system 100 shown in FIG. 1, including the transducer array shown in FIG. 3A, illustrating the angular relationships of the three acoustic beams 104 and the relative position of individual range cells 107 within the beams 104. Two of the beams 104 project outward from the transducer array 103 at an angle in relation to the central axis 200 of the local frame of reference. A central beam 104 projects along this axis 200.

Figure 3C:
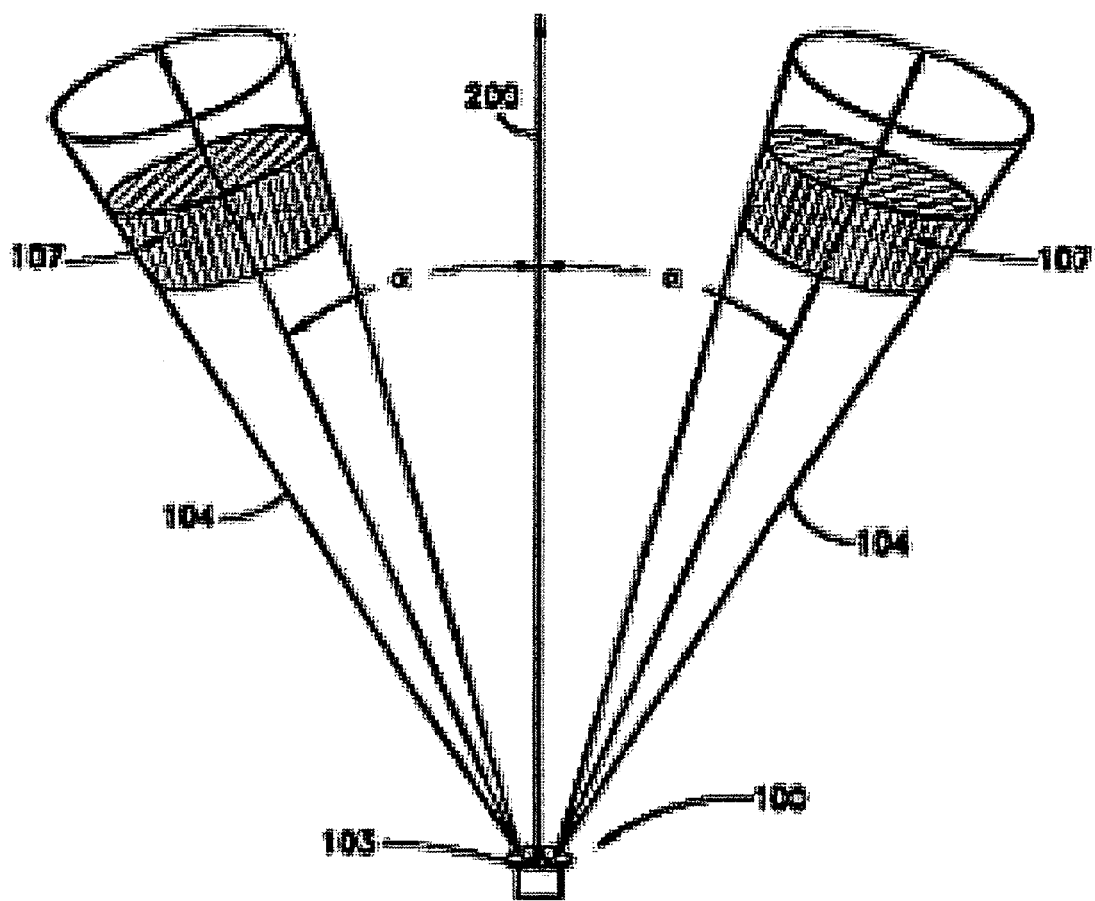
FIG. 3C is a top schematic view of another embodiment of the transducer array similar to that of FIG. 3B, but having two beams.

While certain embodiments are discussed herein with respect to a three beam transducer array 103, it is to be recognized that other embodiments may have four, five, six, or any other suitable number of beams 104, which is generally limited by cost and diminishing returns of performance enhancements. Moreover, other embodiments may have only two beams. For example, FIG. 3C is a top schematic view of another embodiment of the transducer array similar to that of FIG. 3B, but having two beams.

Preferably, each transducer 140 produces a narrow, substantially circular, beamwidth, e.g., 0.75°, which may be referred to as a pencil beam. In one such embodiment, the transducer 140 includes a large element formed from a suitable material, e.g., ceramic, to produce the narrow beam. Pencil beams are used to measure subsurface wave orbital velocities. Pencil beams do not require bubble clouds for measurement, nor do they require intersection of the beam with the surface. Typical cell size in such embodiments is about 4 meters. Fanbeam transducers, having wide beam widths, e.g., 25°, tend to have return signals that are dominated by subsurface bubble clouds generated by breaking waves. In contrast, pencil beams tend to intercept scatterers at a distance below the surface that is predominantly determined by the beam geometry, not by the distribution of the bubble clouds.

Further, embodiments of the system 100 may be generalized to different geometries and system orientations. Thus, embodiments of the system 100 may include arbitrary non-orthogonal beam geometries and arbitrary tilted geometries. For example, in one embodiment, a horizontal ADCP may be pitched up at some arbitrary angle. In one embodiment, the central axis 200 aligns with a horizontal axis that is substantially parallel to the surface of the fluid body. However, as discussed above, the array 103 may also be mounted at somewhat of an angle ("tilt") with respect to the horizontal axis depending on bottom type, contour, and other factors. Such a tilt is accounted for by selecting different range cells 107 or bins within the various beams 104, and using the precise location of each range cell in the calculation of the sensitivity vector, which will be further described below. Additionally, when the array 103 is mounted on a mooring line or on a moving platform, rotation of the array 103 may be induced. Depending on the magnitude of the rotation, effects on the ultimate calculation of a wave directional spectra (WDS), wave height, and current velocity within a given set of range cells may exist. Accordingly, a correction algorithm may be applied, as desired, to compensate for such movement.

Figure 4:
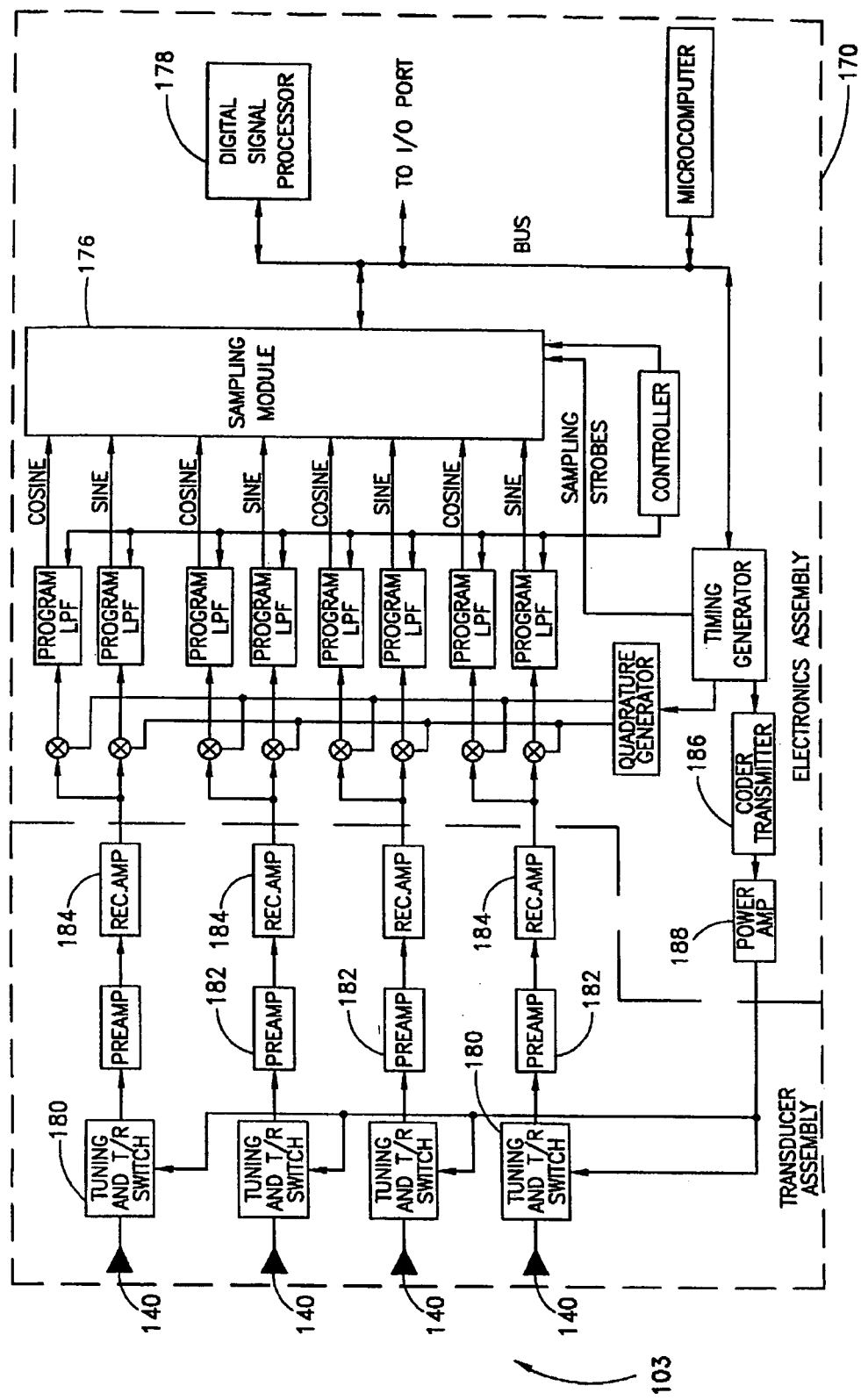
FIG. 4 is a functional block diagram an exemplary embodiment of the electronics for the ADCP such as shown in FIG. 1.

FIG. 4 is a functional block diagram of an exemplary embodiment of the electronics processing unit 102 for a broadband acoustic Doppler current profiler (ADCP) such as a RD Instruments Model BBADCP VM-150. While the following discussion may refer to this ADCP system, it will be recognized that other models and types of sonar systems, such as narrowband Doppler systems or non-Doppler-based systems, may be used with the present invention depending on the particular application and needs of the user.

Referring again to FIG. 4, the transducer array 103 is electrically connected to the electronics assembly 170 which includes a mixer network 172, low pass filter network 174, sampling module 176, and digital signal processor (DSP) 178. Signals generated by the transducer array elements 140 upon the receipt of acoustic signals are fed via the transmit/receive switches 180 to preamplifiers 182 and receiver amplifiers 184 which condition and amplify the signal(s) for further processing by the electronics assembly 170. A coder transmitter 186 and power amplifier 188 are used in conjunction with the DSP 178 to feed transmission signals to the transducer elements 140 via the transmit/receive switches 180. Thus, the same transducer elements are used for both transmit and receive functions. Additional details regarding the exemplary broadband ADCP system are contained in the above-mentioned U.S. Pat. No. Re. 35,535.

It should be emphasized that the above-described embodiment of the system 100 utilizes a standard RD Instruments or other comparable Horizontal ADCP as shown in FIGS. 3A and 3B, and requires no special hardware or modifications. This fact greatly increases the design and manufacturing economy of an embodiment, and allows for easy retrofitting to existing ADCP systems. A pressure sensor is used to measure mean water depth, as well as optionally measure the wave height spectrum as discussed further below. However, such sensors are often available as options on commercial ADCP systems, or can be otherwise easily integrated into or mounted on the ADCP. Various commercially available sensors adapted for underwater use, such as the Sensym Hastelloy C22 flush mount pressure sensor cell, can be used in this application.

Figure 5A:
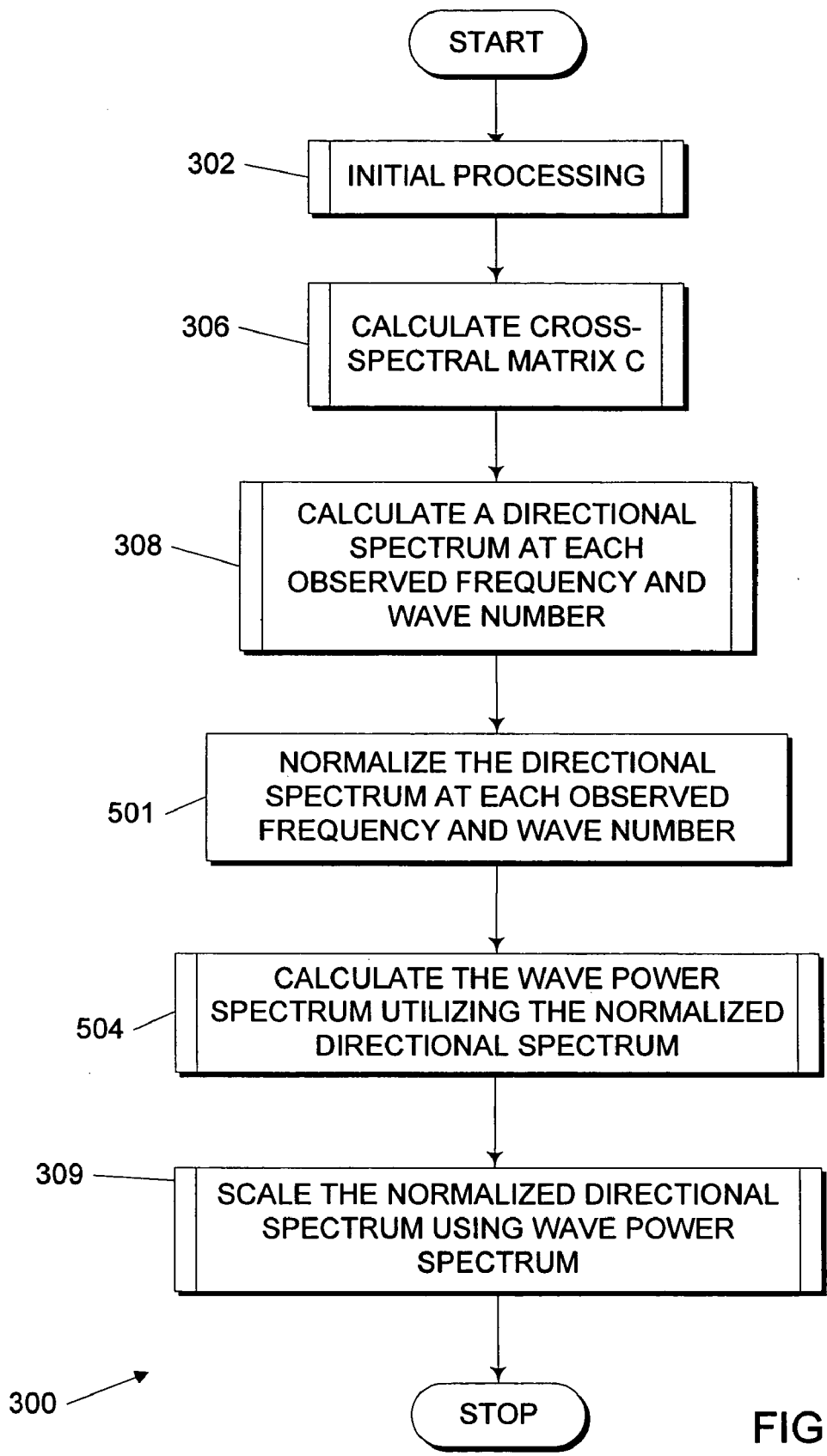
FIG. 5A is a flowchart depicting one embodiment of a method of determining the wave directional spectrum such as in the ADCP system shown in FIG. 3.

FIG. 5A is a flowchart depicting one embodiment of a method 300 for determining the wave directional spectrum in the system 100. The method 300 begins at function 302 where initial processing is performed. Next at function 306, the cross-spectral matrix, C, is calculated. Proceeding to block 308, the directional spectrum is calculated at each observed frequency and wave number. This calculation may include estimating the directional spectrum. Next at block 501, the directional spectrum is normalized at each observed frequency and wave number. Moving to function 504, the wave power spectrum is calculated utilizing the normalized directional spectrum. Next at function 309, the normalized directional spectrum is scaled using the wave power spectrum.

Each of the previously described hardware embodiments of the wave measurement system 100 may utilize the method, or algorithm, 300 to calculate WDS and wave height. The method 300 is typically embodied in the form of software running on the existing signal processing capability of the ADCP (or other chosen sonar system), such as the processing unit 102. However, it will be recognized that the algorithm or components thereof could be embodied in firmware and/or hardware as well. The algorithm is based on a general method of calculating WDS that uses "sensor" data (e.g., current velocity, wave height, and/or pressure data) in conjunction with a sensitivity vector H. The sensitivity vector relates uniquely to the chosen array geometry. The following discussion provides a theoretical overview of the method 300, followed by a detailed description of the operation of the algorithm used in conjunction with the system 100 described above. The previously incorporated U.S. Pat. No. 6,282,151 provides additional detail on the derivation of the sensitivity vector H, cross-spectral matrix C, and wave directional spectrum $D(\theta, f)$.

Unlike instruments having an orthogonal geometry, when using a non-orthogonal geometry, multiple solutions are generally possible for each measured wave. Determination of observed wave energy from beam to beam is dependent on knowledge of wave direction. In other words, the response function of a non-orthogonal array is directionally dependent.

To account for this directionality with non-orthogonal beams, embodiments of the method 300 may calculate the directional spectrum and utilize this information to determine the non-directional spectrum. The directional distribution may be used to determine exactly the vector component of wave energy that is projected down each of the beams.

ADCP sonar systems measure, among other things, the instantaneous current velocity component projected along the axis of each of its angled acoustic beams. The current can then be computed as the mean of the difference in velocities between opposing beams. Since successive positions along the angled beams correspond to different horizontal locations, the set of range cells within the beams constitutes a spatial array. Useful information regarding wave direction is contained in the current velocity cross-spectra (e.g., the array covariance matrix). Several other factors relating to the acoustic beam geometry should be considered, however.

First, the magnitude of the orbital velocity is attenuated as a function of depth of the measurement and the frequency of the wave. At a given frequency, orbital wave velocity decreases with depth. Higher frequency orbital wave velocities decay more rapidly with depth than lower frequency orbital wave velocities. Hence, for the shorter waves, only measurements fairly close to the surface are of practical use.

Second, velocity measured by the sonar is a linear combination of both vertical and horizontal wave velocities, the relative weighting therebetween being a function of both wave direction and water depth. A mathematical relationship connecting the along-beam component of wave velocity and surface elevation is needed to determine the directional wave spectrum.

For practical purposes, a random wave field can be treated as if it were a linear superposition of infinitesimal uniform plane waves, each with a particular directional orientation, frequency, and wave number. Neglecting non-linear effects, the dispersion relation is used to constrain these plane waves to a set that satisfies the linear dispersion relation connecting frequency and wave number. When there is no mean current, the linear dispersion relation for an infinitesimal plane wave is:

$$f = \frac{1}{2\pi}\sqrt{gk\,\tanh(kh)} \quad \text{Eqn. 1}$$

where f is the wave frequency (Hertz),
g is the gravitational acceleration constant (about 9.8 m/s$^2$),
h is the water depth (meters),
k=2π/L is the wave number magnitude (radians per meter), and
L is the wavelength (meters), Allowing for a steady uniform current $u_c$ and assuming an observation platform fixed relative to the bottom, the linear dispersion relation has the somewhat modified form:

$$f_{obs} = f + \frac{1}{2\pi}u_c \cdot k \quad \text{Eqn. 2}$$
$$= \frac{1}{2\pi}\left[\sqrt{gk\,\tanh(kh)} - u_c k \cos(\beta - \theta)\right]$$

where $f_{obs}$ is the observed wave frequency (Hz),
f is the intrinsic wave frequency that would be observed in a reference frame moving with the current (from Eqn. 1), k is the wave number vector perpendicular to the wave crests (radians/m), pointed in the direction the wave moves relative to the water,
β is the azimuth angle of the direction the current is moving toward,
θ is the azimuth angle opposite to the direction of the wave number vector k, (the direction the waves are coming from relative to the water),
$u_c$ is the current vector, and
$u_c=|u_c|$ is the current speed (m/s).

Note that velocity contributions of order (ak)$^2$ and higher are neglected, where a is a measure of wave amplitude (e.g. ak is proportional to wave slope). Terms of order (ak)$^2$ in the dispersion relation are also discarded. Since the waves of interest are those near the spectral peak, which conservatively have slopes less than 0.1, these corrections are less than 1%.

For the wave directional spectrum, the usual convention is to use the linear dispersion relation to eliminate the magnitude k of the wave number as an independent variable. The wave directional spectrum D(θ, f) therefore represents the power spectral density of the infinitesimal plane waves in the two-dimensional azimuth-frequency space.

In general, an instrument for measuring the wave directional spectrum can make use of a combination of velocity, pressure, and/or surface elevation measurements at a single point ("triplet") or at an array of points at or below the water surface. Linear wave theory can be used to relate the directional wave spectrum D(θ, f) to these measurements. The Fourier transforms of measurement time series can be cross-multiplied to form cross spectral coefficients, which can be arranged in a cross-spectral coefficient matrix C at each observed frequency. The so-called "forward relation" is a theoretical model connecting the unknown wave direction spectrum D(θ, f) with the observable array covariance matrix C($f_{obs}$) (the matrix of velocity cross-spectra between the various sonar range cells). The forward relation takes the following form:

$$C(f_{obs}) = \int_{-\pi}^{+\pi} H(\theta, f_{obs})D(\theta, f)H^+(\theta, f_{obs})J d\theta \quad \text{Eqn. 3}$$

where $f_{obs}=f_{obs}(f)$ is the mapping given by Eqn. 2,
H is the sensitivity vector (known from linear wave theory),
$H^\dagger$ is the complex conjugate transpose (Hermitian) of H, $$J = \left|\frac{\partial f}{\partial f_{obs}}\right|_\theta = \left[1 - \frac{u_c \cos(\beta - \theta)}{c_g}\right]^{-1} \text{ is the Jacobian,} \quad \text{Eqn. 4}$$

$$c_g = \frac{d(2\pi f)}{dk} \quad \text{Eqn. 5}$$
$$= \frac{1}{2}c_{ph}\left[1 + \frac{2kh}{\sinh(2kh)}\right] \text{ is the group velocity, and}$$

$$c_{ph} = \frac{2\pi f}{k} = \sqrt{\frac{g}{k}\tanh(kh)} \text{ is the phase velocity} \quad \text{Eqn. 6}$$

Note that the form of the sensitivity vector H is related to the geometry of the array formed by range cells selected from those in the ADCP beams. Each selected range cell from a particular beam and depth corresponds to an element of H. The sensitivity vector H may also optionally contain elements corresponding to surface elevation measured acoustically at each beam, and/or a pressure measurement.

Note also that when there is a current, there may be more than one f that maps to each $f_{obs}$, in which case C is the sum of such mappings. Since negating the frequency is equivalent to reversing the direction o the wave number, θ should be replaced with θ+π when $f_{obs}$ is negative due to strong current.

Again, the forward relation (Eqn. 3) applies to any array or triplet that measures wave directional spectra. The inversion of the forward relation to determine wave directional spectrum from measured cross-spectral matrix C presents significant complexities in that an infinite-dimensional object (D) is to be estimated using a set of finite-dimensional observations (C). Hence, the problem is severely underconstrained and no unique solution exists. A number of different solution techniques have been developed to address the inversion problem. Preferably, embodiments of the method 300 apply data adaptive methods such as the maximum likelihood method (MLM) and iterative maximum likelihood method (IMLM), the general application and operation of which are well known in the signal processing arts. It should be noted that while certain embodiments are described in terms of the MLM and IMLM techniques, other embodiments may apply techniques such as the iterative eigenvector (IEV) method, depending on the particular application.

Figure 5B:
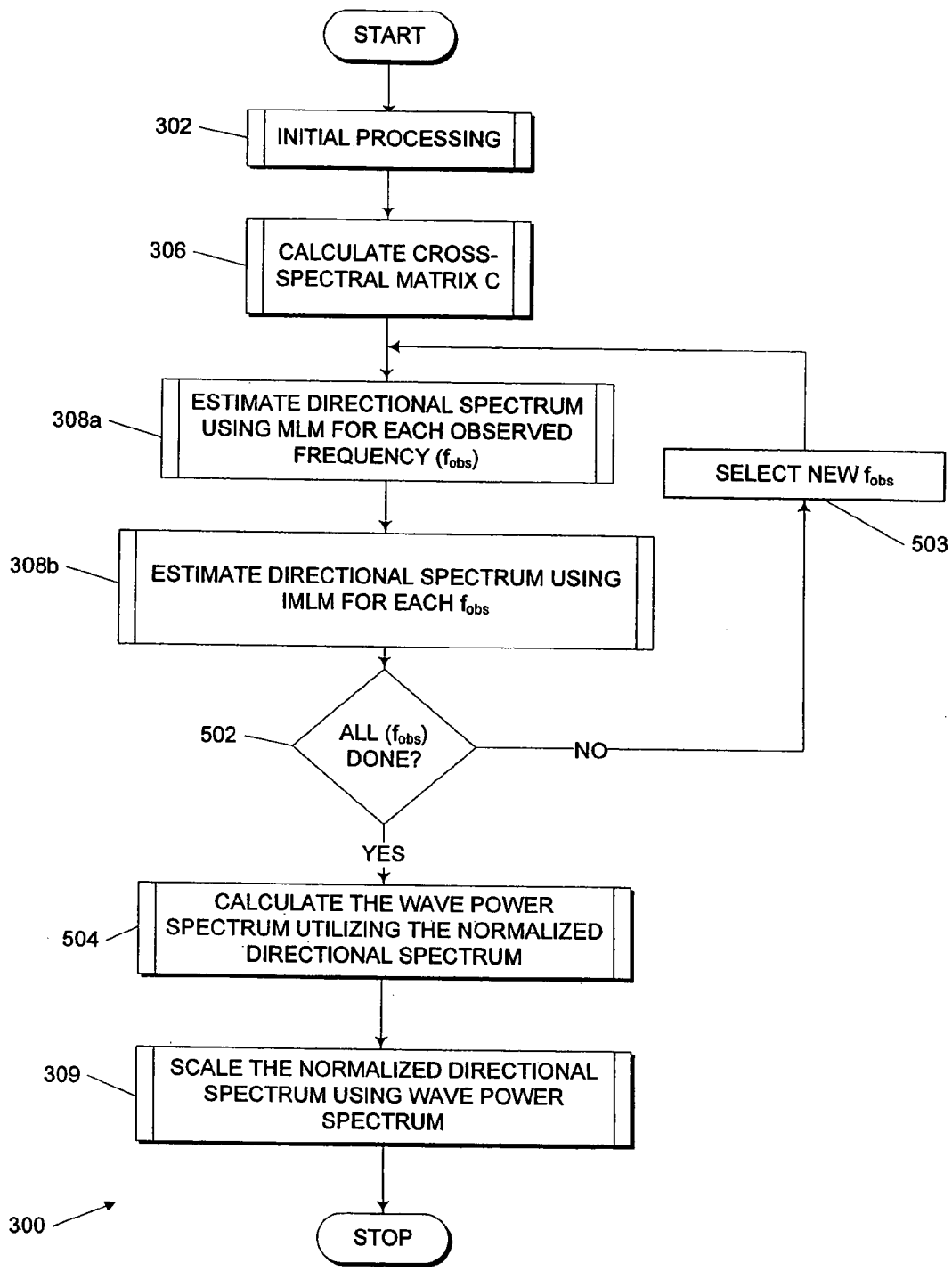
FIG. 5B is a flowchart depicting in more detail the method of FIG. 5A.

FIG. 5B is a flowchart depicting in more detail the method of FIG. 5A. Beginning at function 302, initial data processing is performed to collectively prepare the raw data obtained from the sensors for further processing. Next at function 306, a cross-spectral matrix C for each observed frequency, $f_{obs}$, is calculated. Moving on to function 308a, the wave directional spectrum for an observed frequency is estimated. In one embodiment, this estimation includes using the MLM function 308a. Proceeding to function 308b, the wave directional spectrum for the observed frequency may be estimated using the IMLM function. Next at a decision block 502 if the wave directional spectrum for any observed frequencies have not been estimated, the method 300 proceeds to block 503. At block 503, the next observed frequency is selected and the method 300 returns to block 508a. If no further observed frequencies remain to be processed, the method 502 proceeds to function 504. Next at function 504, the non-directional wave height spectrum is calculated using the directional distribution. Proceeding to function 309, a complete two-dimensional wave directional spectrum is constructed from the estimates derived in functions 308a and 308b. Each of functions 302, 306, 308a, 308b, 504, and 309 is described below in more detail with reference to FIGS. 6, 7, 8, 9, 10, and 11, respectively.

It will be recognized that, depending on the embodiment, the acts or events of the method 300, and all other methods described herein, may potentially be performed in any suitable sequence, may be added, may be merged, or may be left out all together (e.g., not all acts or events may be necessary for the practice of the method). Moreover, it may be possible that acts or events be performed concurrently in parallel rather than sequentially. Furthermore, while specific computations are described, it is possible that other mathematical approaches or techniques may be substituted for the ones described in these embodiments.

Figure 6:
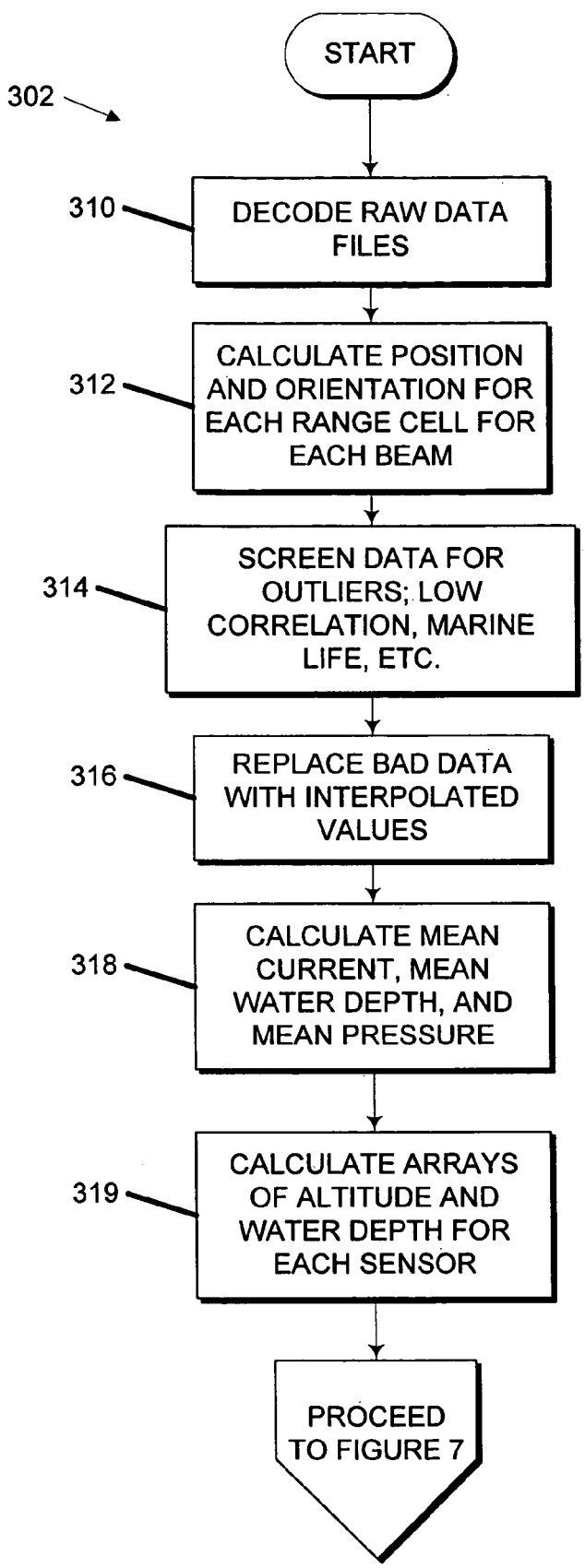
FIG. 6 is a flowchart depicting in more detail portions of the method of FIG. 5B.

FIG. 6 is a flowchart depicting in more the detail the initial processing function 302 of the method 300. Beginning at block 310, raw data obtained from the sensors is decoded using a suitable decoding algorithm such as one selected from known algorithms. Next at block 312, the position and orientation of the range cell of each acoustic beam is calculated. Each range cell 107 in the beam 104 may be treated as an independent sensor. In one embodiment, this is accomplished using the interpolated peak location in the acoustic backscatter intensity, as described in "Measuring Wave Height and Direction Using Upward-Looking ADCPs," Terray, E., et al, IEEE Oceans 1997, August, 1997, which is incorporated herein by reference. In other embodiments, other methods known in the art may be used. Proceeding to block 314, the decoded raw data is processed to identify "outliers," data having a poor correlation, or data associated with other anomalies present in the fluid medium (such as marine life). Next at block 316, "bad" data identified in block 314 is replaced with data derived by interpolating between "good" data values. Moving to block 318, mean values of current velocity (and optionally water depth and pressure) are calculated from the processed data resulting from the data replacement process of block 316. Next at block 319, arrays of sensor altitude above bottom and water depth for the range cells 107 of each sensor are calculated. In one embodiment, this calculation is based upon user-input data in the form of x and y bottom slopes or bathymetry tables, with the tidal component (which is common to all cells) calculated from average pressure sensor or surface height data.

Figure 7:
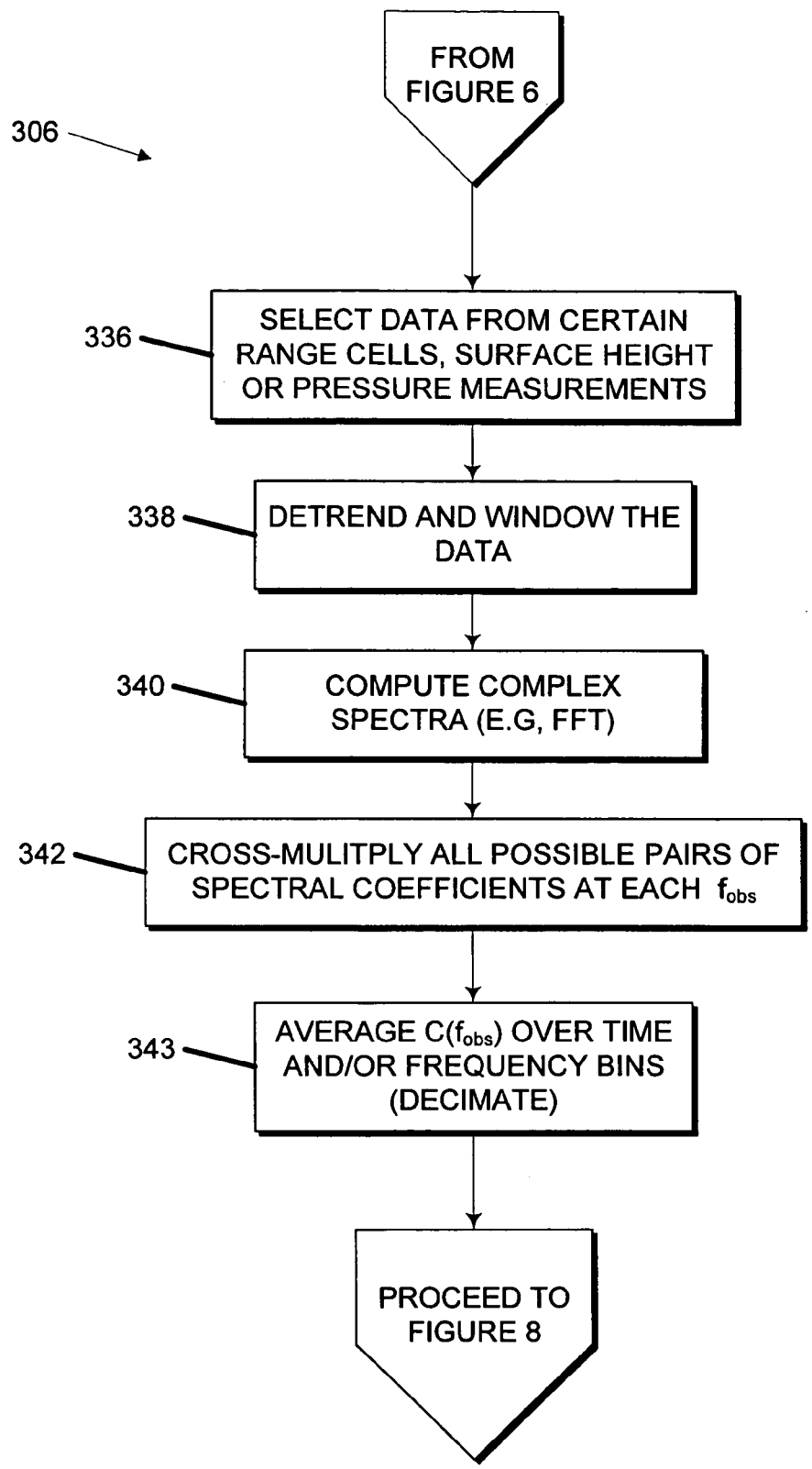
FIG. 7 is a flowchart continuing from FIG. 6, which depicts in more detail portions of the method of FIG. 5B.

FIG. 7 is a flowchart depicting in more the detail function 306 of the method 300, which includes calculating the cross-spectral matrix. Beginning at block 336, as in the calculation of $S_H$ described with reference to FIG. 10, data from specific range cells, surface height data, or pressure sensor data are selected. Note, however, that the data selected in block 336 may be the same as or different from that selected as part of the calculation of $S_H$ in block 322 of FIG. 10. Smaller range cells may be needed to resolve the direction of the shorter waves, while range cells may be combined into larger ones (by averaging velocity measurements) to reduce the noise level for computing the wave height spectrum.

Moving to block 338, again, the selected data is detrended and windowed. More details of suitable algorithms are discussed in, e.g., Oppenheim, A. V., R. W. Schafer, J. R. Buck *Discrete-Time Signal Processing*, Englewood Cliffs, (2nd Ed. 1999), which is incorporated by reference. Next at block 340, after windowing and detrending, complex spectra are computed (using a fast Fourier transform (FFT) or another comparable technique). Proceeding to block 342, all possible pairs of spectral coefficients for each observed frequency ($f_{obs}$) are cross-multiplied. In order to perform this cross-multiplication in block 342, one spectral coefficient from each pair is first complex-conjugated. Next at block 343, the cross-spectral matrices for each observed frequency are averaged over time (and/or within frequency bins, e.g., through decimation) to produce the cross-spectral matrix as a function of observed frequency.

Figure 8:
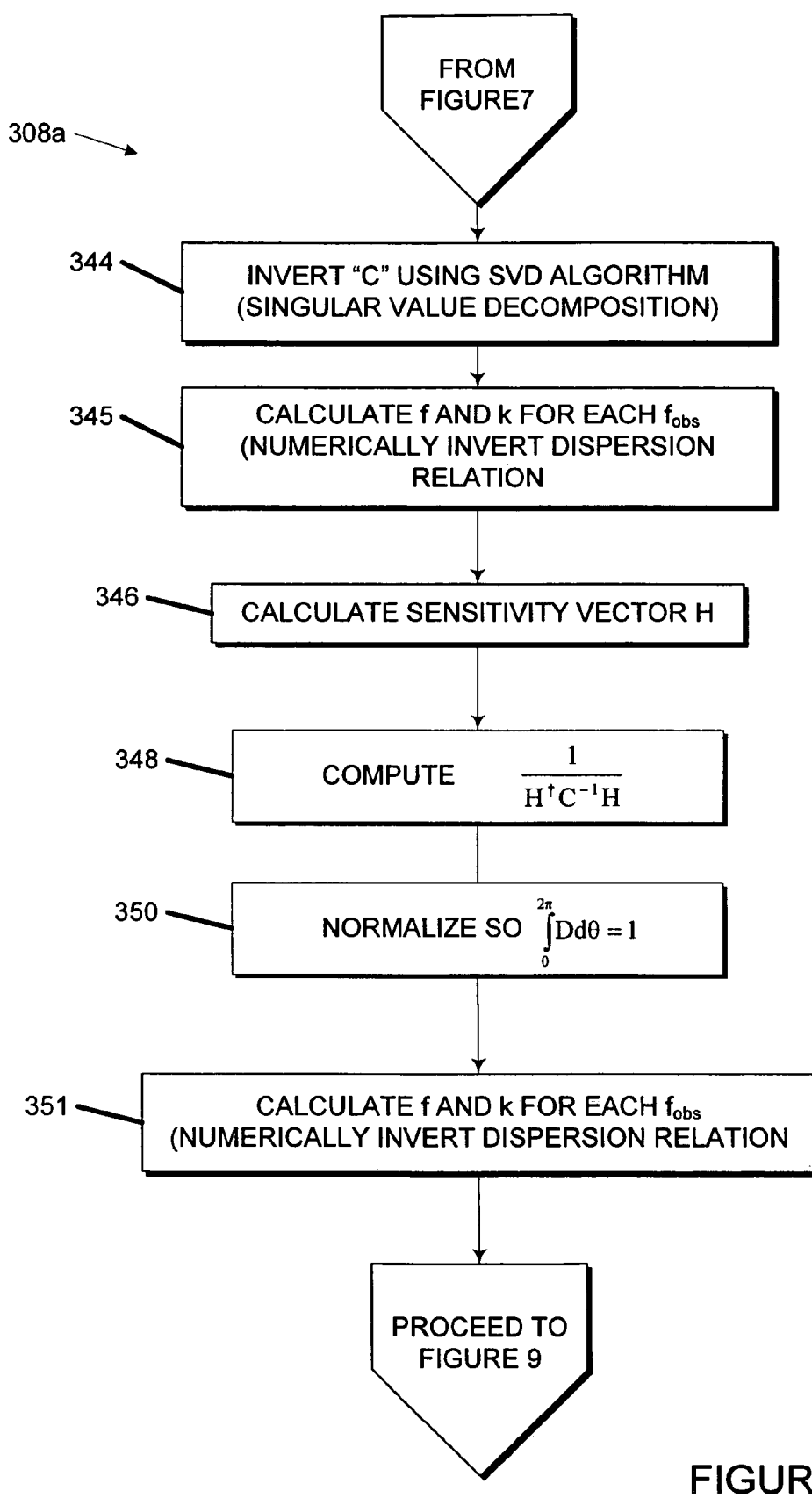
FIG. 8 is a flowchart continuing from FIG. 7, which depicts in more detail portions of the method of FIG. 5B.

FIG. 8 is a flowchart depicting in more the detail function 308a of the method 300, which includes performing the maximum likelihood method (MLM). As previously described, the MLM is one algorithm provides a method for solving the so-called "forward relation" which relates the wave directional spectrum D(θ, f) with the observable cross-spectral matrix $C(f_{obs})$.

Beginning at block 344, the MLM is performed to invert the cross-spectral coefficient matrix C for each observed frequency using a singular value decomposition (SVD) technique. SVD techniques are well known to those skilled in the signal processing technology, and accordingly will not be discussed in further detail herein. Moving to block 345, values of wave frequency (f) and wave number magnitude (k) are calculated using numerical inversion of the linear dispersion relation (see Eqn. 2 above). The block 345 may be performed in the same manner as block 329 of FIG. 7. However, different sets of ranges cells 107 may be used to generate the spectra in each of these blocks.

Next at block 346, the array-specific sensitivity vector H is calculated. Each selected range cell from a particular acoustic beam and depth corresponds to an element of H. Note that H may also contain elements corresponding to optional surface height and pressure measurements. The sensitivity vector H represents the ideal measured response to a plane wave, assuming linear theory and the linear dispersion relation (see previous discussion), and neglecting instrument noise. The linear wave model predicts:

$$\eta(x, t) = a \cos(k \cdot (x - u_c f) - 2\pi \, ft) = a \cos(k \cdot x - 2\pi \, f_{obs} t) \quad \text{Eqn. 7}$$

$$p(x, z, t) = \rho g a \frac{\cosh[k(h+z)]}{\cosh(kh)} \cos(k \cdot x - 2\pi \, f_{obs} t) - \rho g z \quad \text{Eqn. 8}$$

$$u(x, z, t) = a(2\pi \, f) \frac{\cosh[k(h+z)]}{\sinh(kh)} \cos(k \cdot x - 2\pi \, f_{obs} t) \left(\frac{k}{k}\right) + u_c \quad \text{Eqn. 9}$$

$$w(x, z, t) = a(2\pi \, f) \frac{\sinh[k(h+z)]}{\sinh(kh)} \sin(k \cdot x - 2\pi \, f_{obs} t) \quad \text{Eqn. 10}$$

where $\eta$ is the surface elevation (m),
p is the pressure (Pascal),
$\rho$ is the water density (kg/m$^3$),
g is the gravitational acceleration (m/s$^2$),
u is the horizontal velocity vector (m/s),
w is the vertical velocity component (m/s),
a is the half-amplitude of the plane wave (m),
h is the water depth (m),
x is the horizontal position vector, and
z is the vertical position (−h at the bottom, o at the surface) (m).

The Fourier transforms in time of the above sine waves are delta function line spectra, the areas under which are the respective Fourier coefficients (indicated by tildes):

$$\tilde{\eta}(x, f_{obs}) = \frac{1}{2} a \, \exp(ik \cdot x) \quad \text{Eqn. 11}$$

$$\tilde{p}(x, z, f_{obs}) = \frac{1}{2} \rho g a \frac{\cosh pk(h+z)]}{\cosh(kh)} \exp(ik \cdot x) \quad \text{Eqn. 12}$$

$$\tilde{u}(x, z, f_{obs}) = \frac{1}{2} a(2\pi \, f) \frac{\cosh(k(h+z)]}{\sinh(kh)} \exp(ik \cdot x) \left(\frac{k}{k}\right) \quad \text{Eqn. 13}$$

$$\tilde{w}(x, z, f_{obs}) = -\frac{1}{2} i a(2\pi \, f) \frac{\sinh[k(h+z)]}{\sinh(kh)} \exp(ik \cdot x) \quad \text{Eqn. 14}$$

Note that the Fourier coefficient of the surface displacement at x=0 is simply a/2, regardless of the direction or frequency of the plane wave. The squared magnitude of this coefficient is the non-directional power spectrum of the wave height. Therefore the Fourier coefficients of the various measurements are scaled by 2/a to represent the response to a plane wave of unit spectral density.

For velocity measurements, each element of H is computed as the scaled Fourier coefficient corresponding to component of the velocity in the direction of the beam at the location of the range cell:

$$H(z, x_n) = \frac{2}{a} [\tilde{u} + \tilde{w} \hat{i}_z] \cdot b_n \quad \text{Eqn. 15}$$

$$= \frac{2\pi \, f \, \exp[ik \cdot x_n(z)]}{\sinh(kh)} \left[ \cosh[k(h+z)] \left(\frac{k \cdot b_n}{k}\right) - i \sinh[k(h+z)](\hat{i}_z \cdot b_n) \right]$$

where $b_n$ is the unit vector pointing outward in the direction of the $n^{th}$ beam of the sonar system,
$x_n(z)$ is the horizontal displacement vector for the range cell (m), and
$\hat{i}_z$ is the unit vector in the vertical direction.

Note that the x origin should be chosen at the sonar system 100 (ADCP in the preferred embodiment) so that the horizontal component of the beam unit vector $b_n$ points in the same direction as $x_n$. The mapping among k, f, and $f_{obs}$ are given by the linear dispersion relations and their inverses, which are calculated numerically.

For the optional pressure measurement at the ADCP, the corresponding elements of H are:

$$H(z_{ADCP}) = \frac{2}{a} \tilde{p} = \rho g \frac{\cosh[k(h + z_{ADCP})]}{\cosh(kh)} \quad \text{Eqn. 16}$$

Once the sensitivity vector H is calculated in block 346, the method 300 proceeds to block 348 in which the non-normalized wave directional spectrum D($\theta$) is calculated (for the specific observed frequency under consideration) using the following MLM estimator: D($\theta$)

$$D(\theta) = \frac{N_D}{H^\dagger C^{-1} H} \quad \text{Eqn. 17}$$

where $H^H$ is the complex conjugate transpose of the sensitivity vector H, and $C^{-1}$ is the inverse of C.

Next at block 350, the wave directional spectrum D is normalized such that:

$$\int_0^{2\pi} D \, d\theta = 1 \quad \text{Eqn. 18}$$

Proceeding to block 351, values of wave frequency (f) and wave number magnitude (k) are calculated using numerical inversion of the linear dispersion relation (see Eqn. 2).

Figure 9:
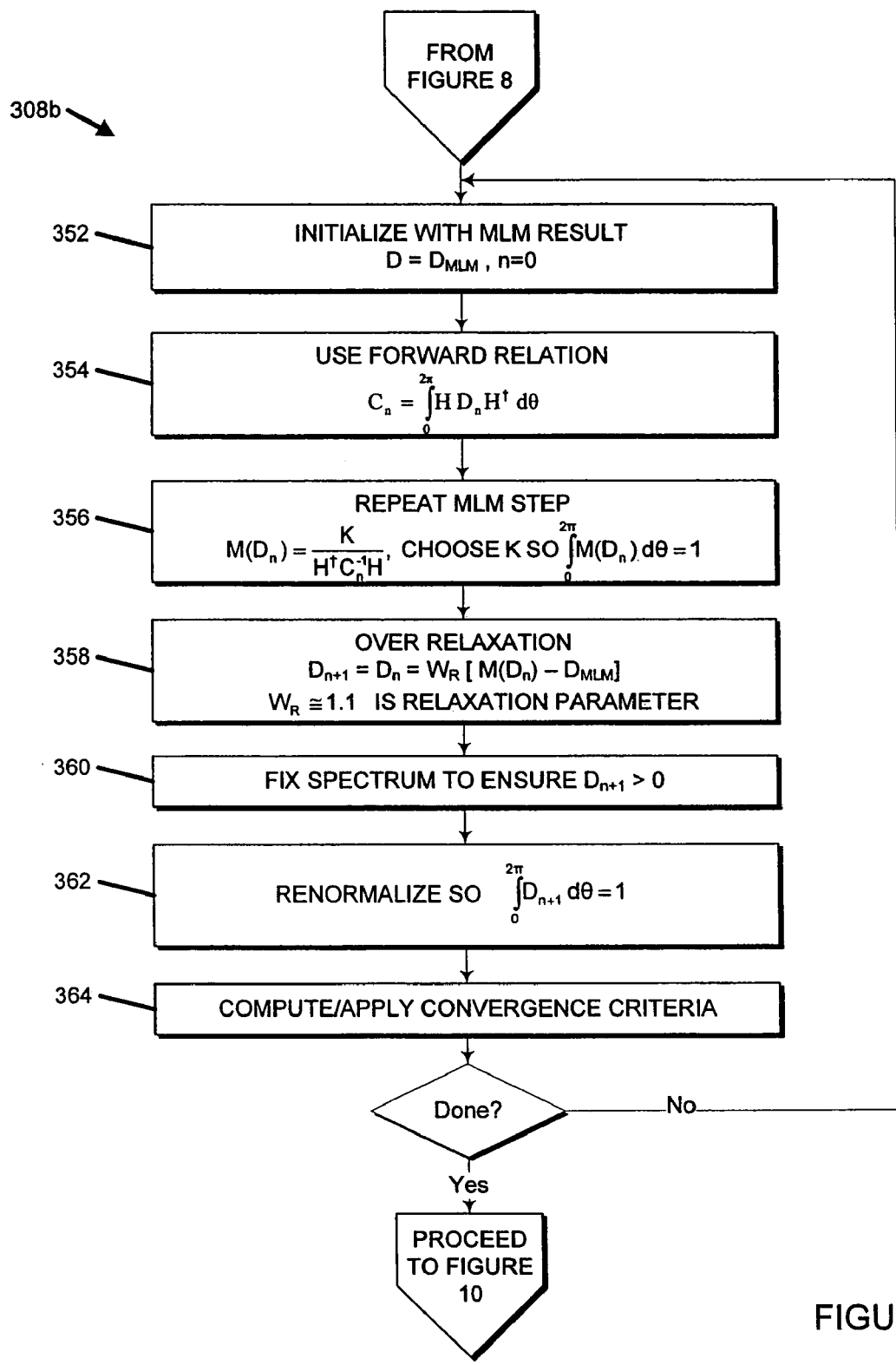
FIG. 9 is a flowchart continuing from FIG. 8, which depicts in more detail portions of the method of FIG. 5B.

FIG. 9 is a flowchart depicting in more the detail function 308*b* of the method 300, which includes performing the iterative maximum likelihood method (IMLM). Note that the function 308*b* is optional, and may be bypassed for one or more observed frequencies according to the embodiments. The function 308*b* of method 300 begins at block 352, which includes initialization with the normalized wave directional spectrum $D_n$ derived for each observed frequency in prior function 308*a*. (Note that the subscript "n" on the wave directional spectrum D is an index used to denote the iteration number. Hence, when n=0, $D_n$=$D_{MLM}$). Next at block 354, the forward relation (Eqn. 3 above) is used to compute the iterative cross-spectral coefficient matrix $C_n$ using the following relationship:

$$C_n = \int_0^{2\pi} HD_n H^\dagger d\theta \qquad \text{Eqn. 19}$$

Next at block 356, the MLM function 308*a* of the method 300 is again repeated using the computed value of $C_n$ in order to derive the matrix M, as follows:

$$M(D_n) = \frac{K}{H^\dagger C_n^{-1} H} \qquad \text{Eqn. 20}$$

where K is chosen such that:

$$\int_0^{2\pi} M(D_n) d\theta = 1 \qquad \text{Eqn. 21}$$

Moving to block 358, the index n is incremented by one (i.e., n+1) and the directional spectrum calculated according to the relationship:

$$D_{n+1} = D_n - \omega_R [M(D_n) - D_{MLM}] \qquad \text{Eqn. 22}$$

where $\omega_R$ is the relaxation parameter, which is chosen to be approximately 1.1 in the present embodiment.

Proceeding to block 360, the spectrum is fixed by zeroing negative values (or a similar procedure) to ensure that $D_{n+1}$ is greater than or equal to zero. Next at block 362, the spectrum is renormalized so that:

$$\int_0^{2\pi} D_{n+1} d\theta = 1 \qquad \text{Eqn. 23}$$

Moving to block 364, the convergence criteria is computed. Note that in one embodiment of the algorithm 300, the convergence criteria are applied to each observed frequency (e.g., upon satisfying the IMLM convergence criteria for a given observed frequency, the MLM function 308*a* and optional IMLM function 308*b* are again performed for the next observed frequency). An exemplary set of criteria are as follows:

i. a fixed maximum number of iterations (typically 3 to 5) has occurred without meeting any other stopping criteria;

ii. the mean absolute difference in the smeared spectra integral $|\int (M(D_n) - D_{MLM}) d\theta|$ is greater than it was on the previous iteration;

iii. the relative squared difference in the measured and forward-relation cross-spectral matrices is less than a predetermined threshold value:

$$\sum_{i,j} \left[ \frac{(C_n - C_{i,j})^2}{\sigma_{(i,j)}} \right] < \text{threshold value} \qquad \text{Eqn. 24}$$

where $\sigma_{i,j}$ is the estimated standard deviation of the i, j-th element of the measured C; or iv. the relative difference in the measured and predicted cross-spectral matrix C (Eqn. 24) is greater than it was on the previous iteration.

The above-listed convergence criteria are applied such that satisfaction of any one (or more) of the criteria will terminate further iteration (for the observed frequency under analysis). When all observed frequencies have been analyzed, the method continues to the method blocks depicted in FIG. 10.

As previously noted, the convergence criteria described herein are but one embodiment, and other criteria or mechanisms for terminating the IMLM iteration process may be substituted depending on the specific application of the algorithm and the needs of the user.

Figure 10:
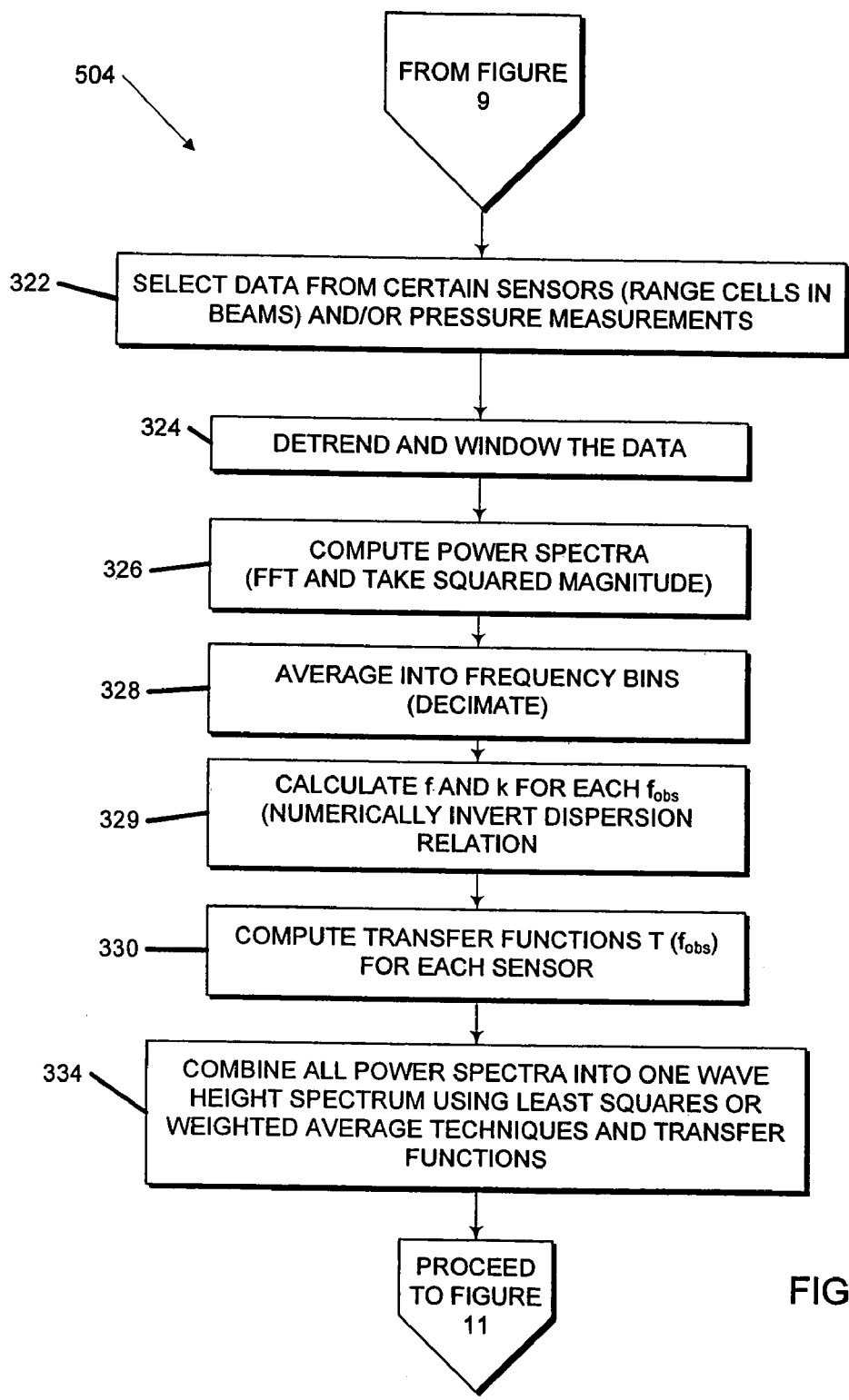
FIG. 10 is a flowchart continuing from FIG. 9, which depicts in more detail portions of the method of FIG. 5B.

FIG. 10 is a flowchart depicting in more the detail function 504 of the method 300, which includes calculating $S_H$. Beginning at block 322, data is selected from certain sensors, e.g., range cells 107 in beams 104. The data may also include pressure measurements. In one embodiment, this data includes velocity data from certain range cells 107 within the acoustic beams 104. This data may be different from that selected in block 336 of FIG. 7. In one embodiment, range cells 107 are selected so as to avoid boundaries such as the surface, objects in the water, etc. In one embodiment, the range cells 106 are selected so as to create a sparse array with elements that are remote from the mounting platform because the platform to which the instrument is mounted may influence the more nearby measurements. Optionally, surface height and pressure data is also selected. It should be emphasized that while an embodiment of method 300 may incorporate wave height and pressure measurements within the sensitivity vector H (see discussion with respect to FIG. 8), such measurements are not required to calculate the WDS. The use of such measurements do, however, generally increase the relative accuracy of the estimate provided by the system.

Next at block 324 of FIG. 10, the selected velocity, surface height, and pressure data is detrended by subtraction of a trendline determined by least-squares fit and windowed by multiplication using a window function of time such as a Bartlett window, for the purpose of reducing spectral leakage. Moving to block 326, the system 100 computes a power spectrum for each set of data by performing a fast Fourier transform (FFT) and squaring the magnitude of the result, although other methods may be used. Next in the block 328, the power spectra are averaged into frequency bins (so-called "decimation").

Moving to block 329, values of wave frequency (f) and wave number magnitude (k) are calculated using numerical inversion of the linear dispersion relation (see Eqn. 2). Proceeding to block 330, transfer functions $T(f_{obs}) = |H|^{-2}$ are then computed for each "sensor" using Eqn. 15. It should be noted that the term "sensor" in the present context refers to either 1) current velocities obtained for each range cell 107 in each acoustic beam; 2) the surface height measurement obtained for each acoustic beam (see calculation of surface height in block 312 above), or 3) the pressure sensor. Combinations of these sensors may also be used to calculate the wave height spectrum.

A number of additional considerations apply to calculations using generalized beam geometries, e.g., non-orthogonal and tilted geometries. The transfer function from local orbital velocity to surface displacement depends on each sensor's depth and orientation. Thus, the sensor-independent transfer function is directionally dependent. Further, the local wave number for each sensor depends on total water depth. Because a horizontal array may span changes in bottom bathymetry, wave number may change between sensors. In addition, the influence of currents on waves is directionally dependent. Thus, the wave number should be independently determined for each sensor in the presence of mean currents.

In one embodiment, the wave height spectrum is calculated using current velocities obtained for each range cell 107 in each acoustic beam. Unlike a vertical ADCP system, in a horizontal ADCP system 100, each of the current velocities obtained for each range cell 107 in each acoustic beam may have a directional dependence. To account for this dependence in the wave height spectrum, a sensitivity factor is calculated by integrating the normalized directional spectrum over wave direction at the corresponding frequency. Because the effect of mean currents on wave number is also directionally dependent, the wave number is directionally dependent, and should be included within this integral.

Derivation of the equation for translation from orbital velocity to surface displacement can be generalized as follows.

k=wave number
H=peak to peak wave height
ω=radian frequency
z=sensor altitude above bottom
h=water depth
E=elevation angle
J=Janus angle
Az=azimuth angle
T=time
η=surface displacement spectrum
i=beam index
u=horizontal orbital velocity component in propagation direction
w=vertical orbital velocity component
v=beam radial velocity
U=FFT of horizontal orbital velocity component in propagation direction
W=FFT of vertical orbital velocity component
V=FFT of beam radial velocity The surface displacement and the horizontal/vertical velocities may be based on linear wave theory.

$$\eta=(H/2)\cos(kx-\omega t)$$

$$u=(H/2)\omega(\cos\ hk(h+z)/\sin\ h(kh))\cos(kx-\omega t)$$

$$w=(H/2)\omega(\sin\ hk(h+z)/\sin\ h(kh))\sin(kx-\omega t)$$

The dispersion relationship is:

$$\omega^2=gk\ \tan\ h(kh)$$

This relates radian frequency ω to wave number k or wavelength. The dispersion relationship relates spatial propagation to time propagation for linear waves.

η(ω)=a(ω) assuming that a(ω) is a uniform plane wave arriving from a single discrete direction. For directional waves:

a=surface amplitude for a single wave frequency and direction

D=normalized directional spectrum in units of power
S=non directional surface amplitude $$\int_\theta a^2(\omega,\theta)=S^2(\omega)\int_\theta D(\omega,\theta)=S^2(\omega).$$

The power in the non-directional spectrum for a given frequency ω, is equal to the power in the directional spectrum at ω, coming from all directions.

In general we assume that waves are linear for this translation. This means that we can treat the waves as a superposition of linearly independent frequencies. Mathematically this means that we can use FFTs to go to the frequency domain then solve the problem for each frequency independently. This is a generally accepted simplification.

$$U(\omega)=FFT(u(t))$$

$$W(\omega)=FFT(w(t))$$

$$U(\omega)=a(\omega)\omega(\cos\ hk(h+z)/\sin\ h(kh))$$

$$U^2(\omega)=a(\omega)^2\omega^2(\cos\ h^2k(h+z)/\sin\ h^2(kh))$$

$$W(\omega)=i\ a(\omega)\omega(\sin\ hk(h+z)/\sin\ h(kh))$$

$$W^2(\omega)=-a(\omega)^2\omega^2(\sin\ h^2k(h+z)/\sin\ h^2(kh))$$

Next, the projections of the horizontal and vertical velocity on the beams are determined and squared so that phase becomes unimportant. This is the general case that can apply to directionally dependent geometries.

$$V_i=W\cos(E)+U\sin(E)\cos(\theta-Az_i)$$

$$V_i^2=W^2\cos^2(E)+U^2\sin^2(E)\cos^2(\theta-Az_i)+2UW\cos(E)\sin(E)\cos(\theta-Az_i)$$

Next, the beam velocities are summed. This can be generalized to sensor velocities where each range cell 107 and beam 104 has its own location and orientation.

$$\Sigma V_i^2=\Sigma W^2\cos^2(E)+U^2\sin^2(E)\cos^2(\theta-Az_i)+2UW\cos(E)\sin(E)\cos(\theta-Az_i)$$

This equation can be solved for a particular embodiment of the transducer array 103. For example, the following derivation applies to the three beam array 103 having a central beam 107 and the other two beams at 20° angles to the central beam 107.

θ=wave direction
$\theta_i$=90 polar angles are all the same
$Az_1$=20 azimuth angles
$Az_2$=−20
$Az_3$=0

$$\Sigma V_i^2=W^2\cos^2(90)+U^2\sin^2(90)\cos^2(\theta-20)+2UW\cos(90)\sin(90)\cos(\theta-20)+W^2\cos^2(90)+U^2\sin^2(90)\cos^2(\theta+20)+2UW\cos(90)\sin(90)\cos(\theta+20)+W^2\cos^2(90)+U^2\sin^2(90)\cos^2(\theta)+2UW\cos(90)\sin(90)\cos(\theta)$$

$$\Sigma V_i^2=U^2[\cos^2(\theta-20)+\cos^2(\theta+20)+\cos^2(\theta)]$$

Substituting in U $$\Sigma V_i^2=a(\omega)^2\omega^2(\cos\ h^2k(h+z)/\sin\ h^2(kh))[\cos^2(\theta-20)+\cos^2(\theta+20)+\cos^2(\theta)]$$

Integrate over all directions $$\Sigma V_i^2=\int_\theta a(\omega,\theta)^2\omega^2(\cos\ h^2k(h+z)/\sin\ h^2(kh))[\cos^2(\theta-20)+\cos^2(\theta+20)+\cos^2(\theta)]d\theta$$

Substituting in a(ω,θ)

$\Sigma V_i^2 = \omega^2 S(\omega)^2 \int_\theta [(\cos h^2 k(h+z)/\sin h^2(kh)) D(\omega,\theta) [\cos^2(\theta-20)+\cos^2(\theta+20)+\cos^2(\theta)] d\theta]$ $S(\omega)^2 = \Sigma V_i^2 / \{\omega^2 \int_\theta [(\cos h^2 k(h+z))/\sin h^2(kh)) D(\omega,\theta) [\cos^2(\theta-20)+\cos^2(\theta+20)+\cos^2(\theta)] d\theta]\}$ $\eta(\omega,\theta) = \sqrt{(\Sigma V_i^2 / \{\omega^2 \int_\theta (\cos h^2 k(h+z))/\sin h^2(kh))[D(\omega,\theta)[\cos^2(\theta-20)+\cos^2(\theta+20)+\cos^2(\theta)] d\theta]\})}$ Theta, the wave direction, is not a discrete value but a distribution $D(\omega, \theta)$. Because we have already solved for the directional spectrum, we have normalized ($\int \theta[D(\omega,\theta) d\theta=1$) directional distributions for each frequency band $\omega$. Thus, by integrating over theta we get an exact result.

Generalizing to a three beam geometry having beams 107 on either side of the center beam 107 with an angle Az as in FIG. 1, this factor, which uses the directional spectrum D calculated in functions 302–308b is:

$$\int_{\theta[D(f_{obs}},\theta)} [\cos^2(\theta-Az)+\cos^2(\theta+Az)+\cos^2(\theta)] d\theta] \qquad \text{Eqn. 25}$$

After this directional factor is calculated, he transfer function for each current velocity obtained for each range cell 107 in each acoustic beam is divided by the directional factor to correct the non-directional spectrum for the directional dependence.

Next at block 334, all power spectra previously calculated are combined into one wave height spectrum $S_H$. In one embodiment, a least squares fit technique and the transfer functions $T(f_{obs})$ are used. In other embodiments, a weighted average technique may be used along with the transfer functions.

Figure 11:
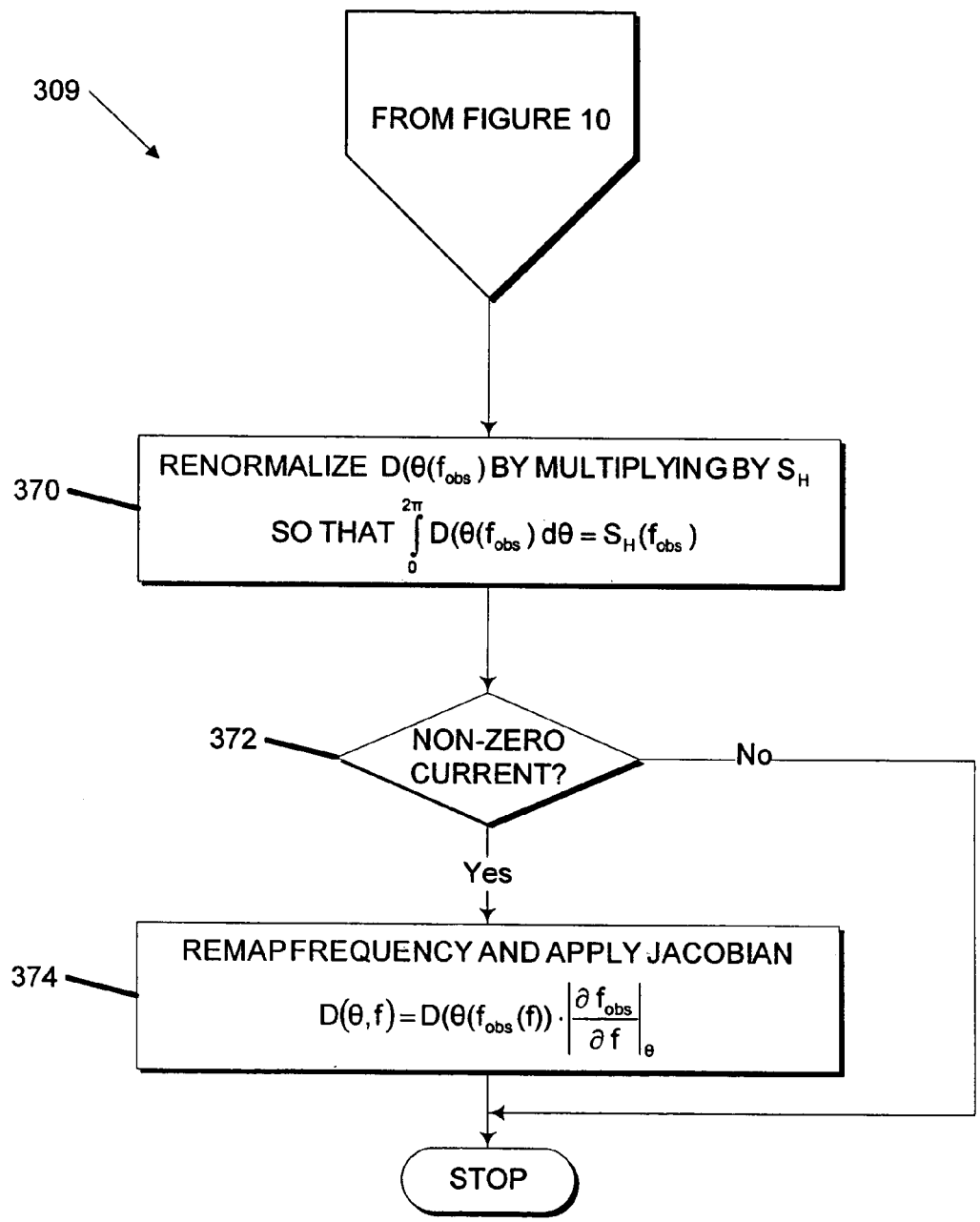
FIG. 11 is a flowchart continuing from FIG. 10, which depicts in more detail portions of the method of FIG. 5B.

FIG. 11 is a flowchart depicting in more the detail function 309 of the method 300, which includes constructing the complete two-dimensional wave directional spectrum by 1) renormalizing the observed frequency-dependent wave directional spectrum; 2) determining the presence of a non-zero current, and 3) in the event of non-zero current, remapping the frequency and applying the Jacobian operator.

Beginning at block 370, renormalization of $D(\theta, f_{obs})$ is accomplished by multiplying by $S_H$ so that:

$$\int_0^{2\pi} D(\theta, f_{obs}) d\theta = S_H(f_{obs}). \qquad \text{Eqn. 26}$$

Next at block 372, the magnitude of the current is examined, and if no current is present (magnitude=0), no further analysis or computation is performed, and the calculation of $D(\theta, f_{obs})$ is complete. If, however, a non-zero current is present, the function 309 proceeds to step 374 in which the frequency is remapped using Eqn. 2, either by interpolating to a regular grid or plotting with a distorted frequency axis (that is, non-linear in observed frequency, linear in intrinsic frequency), and the Jacobian J is applied such that:

$$D(\theta, f) = D(\theta, f_{obs}\{f\}) J \text{ where} \qquad \text{Eqn. 27}$$

$$J = \left| \frac{\partial f_{obs}}{\partial f} \right|_\theta \qquad \text{Eqn. 28}$$

In one embodiment, the function 309 may also include calculating the wave power spectrum and scaling the normalized directional spectrum using the wave power spectrum.

In embodiments of the system 100, such as one including a three beam array 103 in a horizontal configuration with beams 104 separated by 20 degrees, the beam geometry results in low sensitivity to the velocity component that is normal to the center beam 104. As a result, the background noise level of the directional spectrum is non-uniform. Thus, rather than forming a flat plane, a graph of the noise level varies over the wave direction such that the noise defines a series of peaks. These peaks can lead to artifacts in a graphical representation of the directional spectrum. In one embodiment, the directional spectrum is filtered by reducing its value by a direction-dependent threshold. This filtering may be part of the processing of the signal, or merely applied to the graphical display of the data.

As described herein, the wave directional measurement system of the present invention is further capable of calculating the significant wave height associated with waves in the fluid medium. Specifically, the significant wave height $H_s$ (measured in meters) is calculated as 4 times the square root of the area under the wave height spectrum $S_H$ (see previous discussion of FIG. 11 for derivation of wave height spectrum) over the frequency range of interest, typically 0.03 to 0.5 Hz. This frequency range is expected to be dominated by waves rather than tidal fluctuations or noise. This calculation is similarly performed using the processors of the ADCP and/or as a post-processing task on an external computer.

It will be recognized that while certain embodiments discussed above include horizontal beam geometries, other embodiments of the system 100 may include different beam geometries without modifying the method 300. For example, the system 100 may include tilted beams 104. In one embodiment, the system 100 generates beams 104 that are substantially horizontal. For example, producing beams within 1–2 degrees of horizontal. In another embodiment, the system 100 is configured to produce horizontal beams 104 with a moderate amount of tilt. For example, the beams 104 may be tilted within the range of 1 degree to 45 degrees of horizontal. In another embodiment, the system 100 may comprise an upward looking ADCP such as described in incorporated U.S. Pat. No. 6,282,151.

Embodiments of the system 100 may support a variety of configurations. In one exemplary embodiment, three configurations are supported. A typical configuration may balance current profiling range with wave performance (high frequency cut-off). An exemplary typical configuration may include, for example, a 2.0 Hz data rate, and 4 meter bins, and a broadband mode with a 200 meter nominal range. Another configuration may be a long range configuration to maximize current profiling range, while retaining reasonable wave performance (high frequency cut-off). An exemplary high precision configuration may include a 1.4 Hz data rate, 8 meter bins, and a long range mode of 280 meter nominal range. A third configuration may be a high resolution configuration to maximize current profiling resolution close in to the ADCP while providing good wave performance. An exemplary high precision configuration may include a 2.0 Hz data rate, 2 meter bins, and a broadband mode with a 100 meter nominal range. These modes may be user selectable or automatically determined based on pre-defined criteria relating to the installation and selected application.

Figure 12:
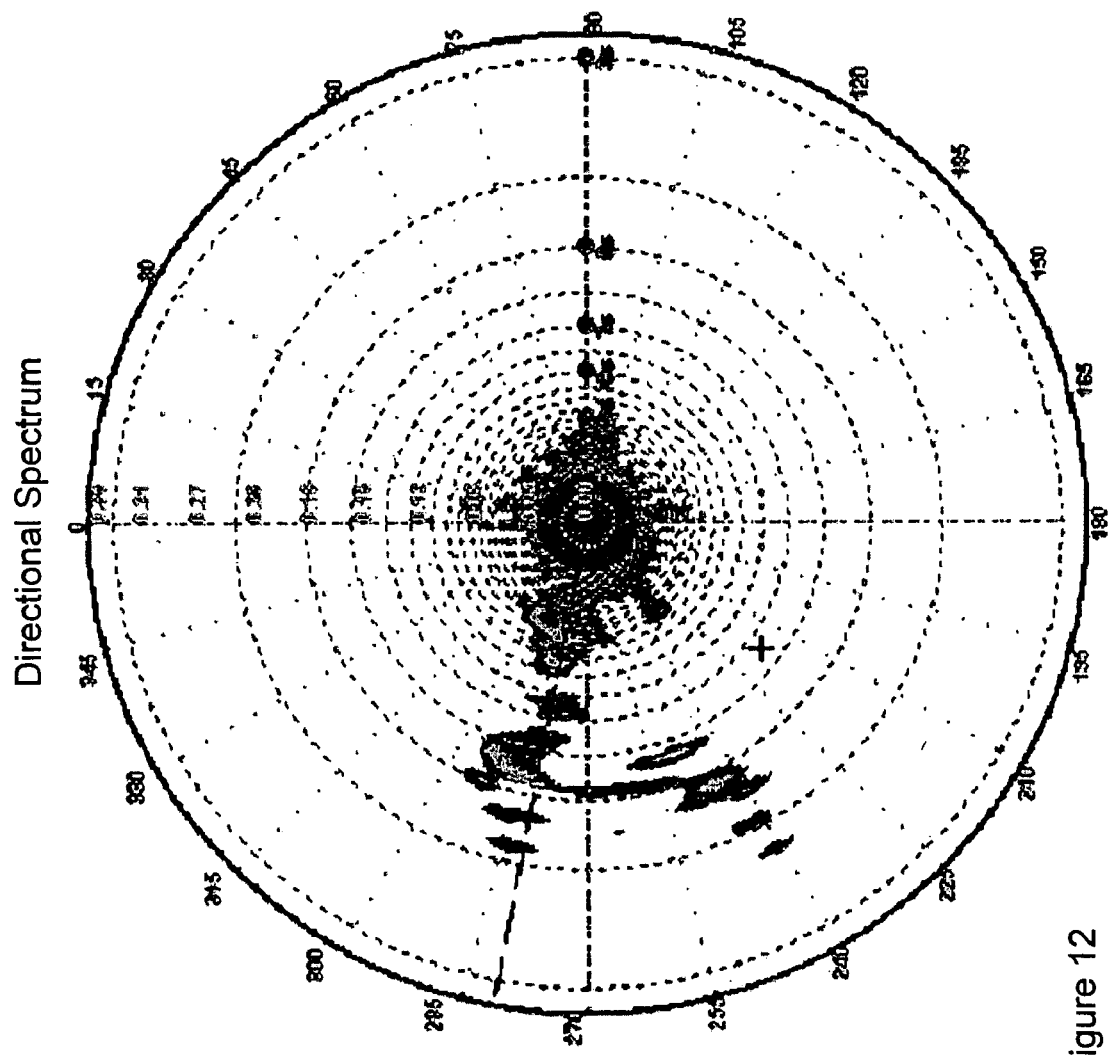
FIG. 12 graphically illustrates an exemplary output directional spectrum calculated by one embodiment of a system such as is depicted in FIG. 1.

FIG. 12 graphically illustrates an exemplary output directional spectrum calculated by one embodiment of a system such as is depicted in FIG. 1. The figure depicts the wave directional spectrum in a two dimensional format of a polar plot of wave intensity, direction, and frequency distribution.

Embodiments of horizontal ADCP systems 100 have numerous advantages. For ports, harbors, or offshore users, the near surface currents and waves can be measured at substantial range from the instrument. Further, the ADCP can be mounted to a platform riser, where it is safely out of the way of operations, and directed away from the platform to provide waves and currents information from regions uninfluenced by the presence of the riser. Moreover, the horizontally mounted system 100 will have larger range cells (300 kHz with 4-meter range cells) than an instrument with vertical beams because such an instrument is not limited to smaller range cell resolution by the exponential decay of wave energy in the vertical. Larger range cells make a very low variance measurement (15 mm/s). Low variance improves the signal to noise ratio and directional performance. Also, the spatial aperture in a horizontal array is large, which directly improves the directional acuity. In addition, a wide variety of range cell combinations provide a well covered, sparse array, eliminating spatial aliasing at wavelengths of interest.

In coastal regions (shallow water) the orbital velocity generally includes much more horizontal motion than vertical. A horizontally mounted Doppler will thus measure more directly the wave orbital. This increases the signal to noise ratio, which in turn improves directional performance.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of calculating wave spectra in a fluid medium utilizing a plurality of acoustic transducers, comprising:
receiving echoes produced within at least two range cells, wherein the echoes are generated by a plurality of acoustic beams from the transducers, at least one of the plurality of acoustic beams being positioned at a non-orthogonal angle with respect to at least one other of the plurality of acoustic beams, and the beams having the at least two range cells located at least partly therein and wherein the signals associated with the echoes comprise data indicative of a plurality of observed frequencies;
for each of the plurality of observed frequencies:
calculating a cross-spectral matrix,
data adaptively estimating the wave directional spectrum by use of the cross-spectral matrix, and
calculating a non-directional height spectrum by use of the wave directional spectra.

2. The method of claim 1, further comprising calculating a full two-dimensional directional spectrum.

3. The method of claim 1, wherein data adaptively estimating the wave directional spectrum comprises performing at least one of a maximum likelihood method and an iterative maximum likelihood method.

4. The method of claim 1, wherein data adaptively estimating the wave directional spectrum comprises performing an iterative eigenvector method.

5. The method of claim 1, wherein the non-orthogonal angle comprises an angle in the range of 20 degrees to 40 degrees.

6. The method of claim 1, wherein at least one of the plurality of acoustic beams comprises a substantially circular acoustic beam.

7. A system for measuring the directional spectrum of waves in a fluid medium having a substantially planar surface, comprising:
a sonar system having a plurality of transducers for generating respective acoustic beams and receiving echoes from one or more range cells located substantially within the beams, at least one of the plurality of acoustic beams being generated at a non-orthogonal angle with respect to at least one other of the plurality of acoustic beams; and
a computer program, executed by a processor, configured to calculate a directional spectrum associated with the waves from the received echoes, wherein the computer program further utilizes a sensitivity vector as part of the calculation of the directional spectrum, and wherein the sensitivity vector comprises an element for each range cell from a particular beam at a particular depth.

8. The system of claim 7, wherein the sonar system comprises a broadband acoustic Doppler current profiler (ADCP).

9. The system of claim 7, wherein the non-orthogonal angle is approximately 20 degrees.

10. The system of claim 7, wherein the non-orthogonal angle comprises an angle in the range of 20 degrees to 40 degrees.

11. The system of claim 7, wherein the received echoes are related to the current velocity within the range cells.

12. The system of claim 7, wherein the transducers are arranged in a Janus configuration.

13. The system of claim 7, wherein the transducers are in a phased array configuration.

14. The system of claim 7, wherein the computer program is further configured to calculate a non-directional height spectrum.

15. The system of claim 7, wherein the computer program is further configured to:
calculate a cross-spectral matrix; and
calculate the two dimensional directional spectrum from the cross-spectral matrix, the directional spectrum, and the sensitivity vector.

16. The system of claim 7, wherein the fluid medium comprises water.

17. The system of claim 7, wherein the processor is independent from the sonar system.

18. The system of claim 7, wherein the processor is included in the sonar system.

19. The system of claim 7, wherein the processor comprises a signal processor.

20. A method of calculating the directional spectrum of a wave in a fluid medium utilizing a plurality of acoustic transducers, comprising:
generating a plurality of acoustic beams from the transducers, at least one of the plurality of acoustic beams being positioned at a non-orthogonal angle with respect to at least one other of the plurality of acoustic beams, and the beams having range cells located at least partly therein;
receiving echoes produced within an array comprising two or more of the range cells;
processing signals indicative of the received echoes;

storing a sensitivity vector, the vector being formed from data based on the signals and the geometry of the array of range cells, wherein the sensitivity vector comprises elements for at least two range cells at different depths within an acoustic beam; and estimating the directional spectrum of the wave based on the signals and the sensitivity vector.

21. The method of claim 20, wherein the non-orthogonal angle comprises an angle in the range of 10 degrees to 89 degrees.

22. The method of claim 20, wherein the non-orthogonal angle comprises an angle in the range of 20 degrees to 40 degrees.

23. The method of claim 20, further comprising:
calculating a non-directional spectrum based at least partly on the directional spectrum.

24. The method of claim 20, wherein the processing of the signals indicative of the received echoes comprises:
decoding the raw data associated with the received echoes;
calculating the position and orientation of each of the range cells;
calculating a mean value of current in the fluid medium; and
numerically inverting a linear dispersion relation, wherein the linear dispersion relation relates wave frequency, water depth, and wave number.

25. The method of claim 20, additionally comprising generating the sensitivity vector which comprises:
selecting at least one range cell from at least two of the acoustic beams;
calculating a plurality of velocity components for each of the selected range cells;
calculating a plurality of Fourier coefficients associated with each of the velocity components; and
calculating the sensitivity vector from the plurality of Fourier coefficients.

26. The method of claim 20, wherein the estimating of the directional spectrum comprises:
calculating the cross-spectral matrix C;
calculating a directional spectrum at each observed frequency;
normalizing the directional spectrum at each observed frequency;
calculating the wave power spectrum utilizing the normalized directional spectrum; and
scaling the normalized directional spectrum using the wave power spectrum.

27. The method of claim 20, wherein the sensitivity vector comprises elements corresponding to surface height and pressure within the fluid medium.

28. The method of claim 20, wherein the estimating the directional spectrum comprises maximum likelihood processing of the signals indicative of the received echoes.

29. The method of claim 20, wherein the estimating the directional spectrum comprises filtering directional noise components from the directional spectrum.

30. The method of claim 29, wherein filtering directional noise components from the directional spectrum comprises removing portions of the spectrum below a directionally-dependent threshold.

31. The method of claim 28, wherein the estimates of the directional spectrum further comprises iterative maximum likelihood method (IMLM) processing.

* * * * *